US010601995B2

(12) United States Patent
Feast et al.

(10) Patent No.: US 10,601,995 B2
(45) Date of Patent: Mar. 24, 2020

(54) SYSTEMS AND METHODS FOR COMMUNICATION ROUTING

(71) Applicant: Cogito Corporation, Boston, MA (US)

(72) Inventors: Joshua Feast, Boston, MA (US); Ali Azarbayejani, Boston, MA (US); Skyler Place, Boston, MA (US); Ayaz Hameed, Somerville, MA (US)

(73) Assignee: Cogito Corporation, Boston, MA (US)

( * ) Notice: Subject to any disclaimer, the term of this patent is extended or adjusted under 35 U.S.C. 154(b) by 0 days.

(21) Appl. No.: 16/194,188

(22) Filed: Nov. 16, 2018

(65) Prior Publication Data
US 2019/0158671 A1 May 23, 2019

Related U.S. Application Data

(60) Provisional application No. 62/588,425, filed on Nov. 19, 2017, provisional application No. 62/588,266, filed on Nov. 17, 2017.

(51) Int. Cl.
*H04M 3/00* (2006.01)
*H04M 3/523* (2006.01)
(Continued)

(52) U.S. Cl.
CPC ........ *H04M 3/5233* (2013.01); *G06Q 10/063* (2013.01); *G06Q 10/0633* (2013.01); *G06Q 10/06395* (2013.01); *G06Q 10/06398* (2013.01); *G06Q 10/10* (2013.01); *G06Q 30/016* (2013.01); *H04M 3/5175* (2013.01); *G10L 25/63* (2013.01); *H04M 2201/18* (2013.01); *H04M 2203/402* (2013.01); *H04M 2203/404* (2013.01)

(58) Field of Classification Search
CPC . H04M 3/5233; H04M 3/5235; H04M 3/5232
USPC ...................... 379/265.12–265.13
See application file for complete search history.

(56) References Cited

U.S. PATENT DOCUMENTS 7,665,024 B1 * 2/2010 Kondziela ............... G06F 3/011
715/745
10,135,989 B1 * 11/2018 Indyk .................. H04M 3/5235
(Continued)

FOREIGN PATENT DOCUMENTS

WO WO-2008/053488 A1 5/2008

OTHER PUBLICATIONS

International Search Report, International Applicaiton No. PCT/US2018/061672 (Systems and Methods for Communication Routing, filed Nov. 16, 2018), 3 pages, Mar. 22, 2019.
(Continued)

*Primary Examiner* — Rasha S Al Aubaidi
(74) *Attorney, Agent, or Firm* — Choate, Hall & Stewart LLP; William R. Haulbrook; Alexander D. Augst

(57) ABSTRACT

Apparatus and methods consistent with the present disclosure route electronic communications to an appropriate resource that can efficiently and effectively provide responses to inquires included in or that are associated with a particular electronic communication. Methods and apparatus consistent with the present disclosure may be optimized for various different types of communication mediums with different sets of capabilities, requirements, or constraints by evaluating data that may be associated with historical information or with a stream of information.

20 Claims, 10 Drawing Sheets

(51) Int. Cl.
*G06Q 30/00* (2012.01)
*G06Q 10/10* (2012.01)
*G06Q 10/06* (2012.01)
*H04M 3/51* (2006.01)
*G10L 25/63* (2013.01)

(56) References Cited

U.S. PATENT DOCUMENTS

2004/0062363 A1* 4/2004 Shambaugh ............ H04M 3/51
 379/88.01
2011/0010173 A1 1/2011 Scott et al.
2013/0223610 A1* 8/2013 Kohler ................ H04M 3/5175
 379/265.02

OTHER PUBLICATIONS

Written Opinion, International Applicaiton No. PCT/US2018/061672 (Systems and Methods for Communication Routing, filed Nov. 16, 2018), 5 pages, Mar. 22, 2019.

* cited by examiner

| Agent ID | General Data | | | Parameters | | | |
|---|---|---|---|---|---|---|---|
| | Agent Age | Type of Data | Event Time | Pace | Waveform Frequency | Polite Words | Thank You's |
| TB12 | 25 | Audio Data | 0-5 minutes | 160/wpm | 225 Hz | 15 | 8 |
| JB07 | 25 | Audio Data | 0-5 minutes | 175/wpm | 250 Hz | 1 | 6 |
| JT12 | 25 | Audio Data | 0-5 minutes | 180/wpm | 260 Hz | 6 | 4 |
| : | : | : | : | : | : | : | : |
| : | : | : | : | : | : | : | : |
| : | : | : | : | : | : | : | : |

FIG. 8

SYSTEMS AND METHODS FOR COMMUNICATION ROUTING

CROSS REFERENCE TO RELATED APPLICATIONS

This application claims benefit of U.S. Provisional Patent Application Ser. No. 62/588,266, filed Nov. 17, 2017, entitled "SYSTEMS AND METHODS FOR COMMUNICATION ROUTING," and U.S. Provisional Patent Application Ser. No. 62/588,425, filed Nov. 19, 2017, entitled "SYSTEMS AND METHODS FOR COMMUNICATION ROUTING," the disclosures of which are incorporated herein by reference in their entireties.

BACKGROUND OF THE INVENTION

Field of the Invention

The present invention is generally directed to systems and methods for routing client communications. More specifically the present disclosure is directed to providing information to clients efficiently as possible.

Description of the Related Art

Customer call centers receive calls each day from customers, clients, or interested parties that have a need or a concern that need be addressed. Call centers receive calls regarding various different subjects. Such subjects may, for example, be related to understanding product information, acquiring information, or to have a question answered. No matter what subject, each call center is concerned with cost effectively providing excellent customer service by answering questions or providing relevant information to callers quickly and politely.

Large companies, organizations, or enterprises are increasingly concerned with maintaining or improving customer satisfaction by being able to quickly and efficiently service their customer needs when such needs arise. Strategically, the organization with the best customer satisfaction will more likely retain customers for the long term. Today, call centers not only receive telephone calls from customers or clients, they also receive communications via other forms of communications, such as instant messages of various sorts (text messages, short message service (SMS) messages, 'chat' messages), and electronic mail (email) for example. In such instances, communications may be routed to either automated assistants or to live persons when a customer or client message is received.

While attempting to provide users with efficient and effective responses, many call centers fail to meet or exceed user expectations. In certain instances, this may be because an automated assistant is not optimized or capable of providing a response that can satisfy a user. Alternatively or additionally, even live persons communicating with an individual may be unable to provide a customer with responses that meet that customer's needs for reasons that may include fatigue or lack of specific knowledge.

What are needed are new ways to identify how best to forward and process user communications in quick and efficient ways that meet or exceed user expectations.

SUMMARY OF THE PRESENTLY CLAIMED INVENTION

The presently claimed invention relates to a method, a non-transitory computer readable storage medium, or a system executing functions consistent with the present disclosure. A method consistent with the present disclosure may receive requests from computing devices via first type of communication channel, receive information included in communications with the requestor computing device, calculate a score, identify that score met a threshold associated with exhaustion threshold, and initiate a corrective action after identifying that the score met the exhaustion threshold.

When the presently claimed invention is implemented as a non-transitory computer readable storage medium, a processor executing instructions out of a memory may also receive requests from computing devices via a first type of communication channel, receive information included in communications with the requestor computing device, calculate a score, identify that score met a threshold associated with exhaustion threshold, and initiate a corrective action after identifying that the score met the exhaustion threshold.

An apparatus consistent with the present disclosure may include a processor that executes instruction out of a memory when implementing methods consistent with the present disclosure. Here again the method may include receiving requests from computing devices via first type of communication channel, receiving information included in communications with the requestor computing device, calculating a score, identifying that score met a threshold associated with exhaustion threshold, and initiating a corrective action after identifying that the score met the exhaustion threshold.

The presently claimed invention relates to technologies (e.g., a method, a non-transitory computer readable storage medium, and/or apparatus) that may include receiving a request from a computing device associated with a requestor that is associated with a first type of communication channel. In some embodiments, the technologies may include receiving information included in a set of communications with the requestor computing device; calculating an emotional exhaustion score, the calculation based on the received information included in the set of communications. In some embodiments, the technologies may include identifying that the emotional exhaustion score has at least met an emotional exhaustion threshold. In some embodiments, the technologies may include initiating a corrective action based on the emotional exhaustion score at least meeting the exhaustions threshold.

In some embodiments, a corrective action may include routing communications from the requestor user device to a computing device associated with a human agent. In some embodiments, the technologies may include collecting communication information associated with communications between the requestor computing device and the human agent computing device.

In some embodiments, the technologies may include calculating an emotional exhaustion score associated with the human agent.

In some embodiments, the technologies may include identifying that the human agent emotional exhaustion score has crossed a threshold associated with the human agent.

In some embodiments, the technologies may include sending advice messages to the human agent computing device.

In some embodiments, the technologies may include identifying that the performance of the human agent is consistent with an event in a reward trigger list. In some embodiments, the human agent may be provided with the reward based on the identification that the performance of the human agent is consistent with the event.

In some embodiments, the technologies may include identifying that the performance of the human agent is consistent with a correlation threshold related to a human performance factor. In some embodiments, the technologies may include storing information associated with the performance of the human agent in a database based on the identification that the performance of the human agent is consistent with the correlation threshold.

BRIEF DESCRIPTION OF THE DRAWINGS

FIG. 8 includes a table of data that associates data associated with different agents with parametric data collected over a span of time.

DETAILED DESCRIPTION

Figure 1:
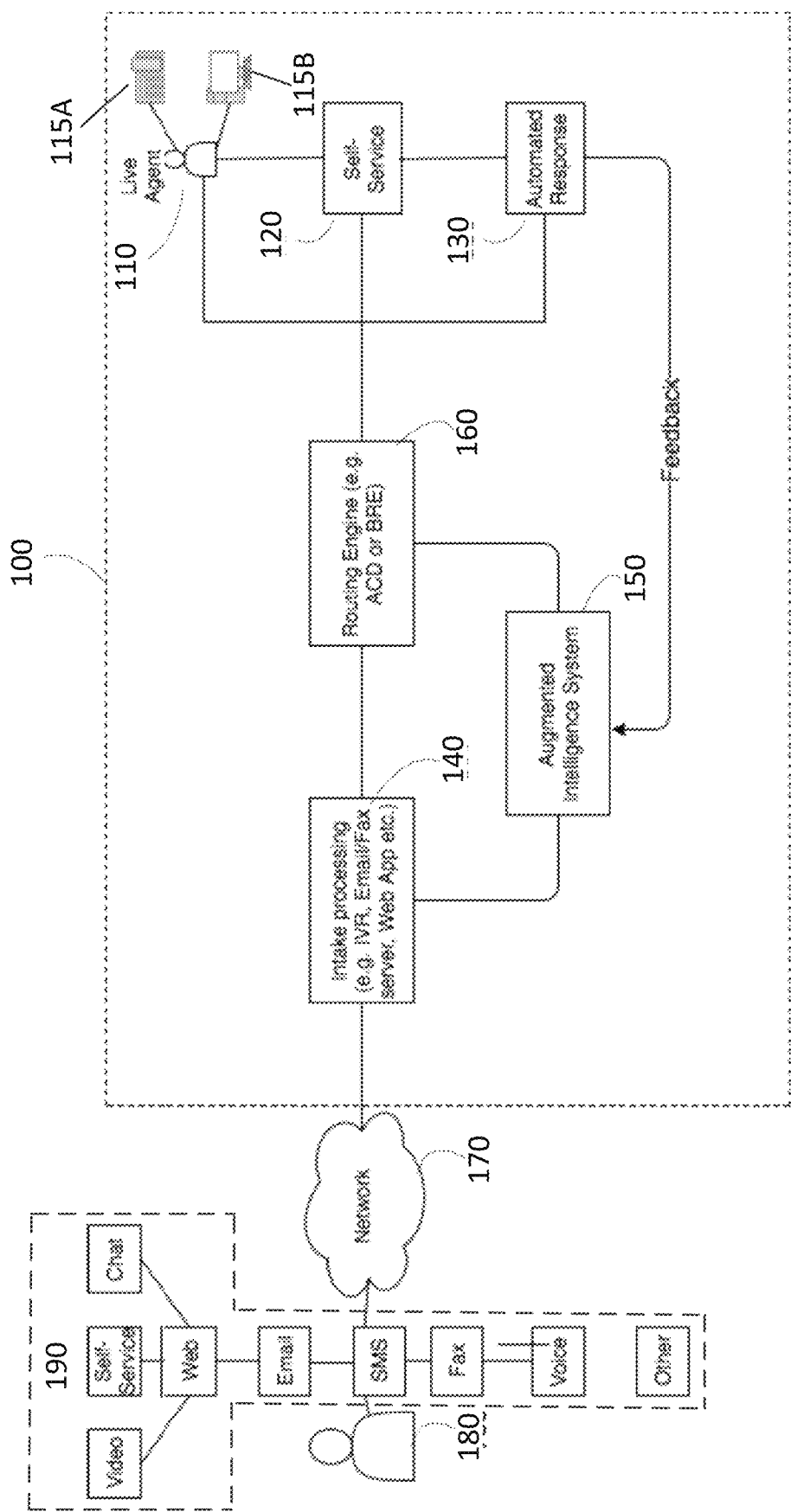
FIG. 1 illustrates an example digital data processing contact center environment consistent with the present disclosure.

Apparatus and methods consistent with the present disclosure route electronic communications to an appropriate resource that can efficiently and effectively provide responses to inquires included in or that are associated with a particular electronic communication. Methods and apparatus consistent with the present disclosure may be optimized for various different types of communication mediums with different sets of capabilities, requirements, or constraints by evaluating data that may be associated with historical information or with a stream of information.

This specification describes example systems and processes that route electronic communications. For example, the technologies described herein may be used to connect a user of a contact center to a contact center agent. An example system may comprise an intake processing system to process an incoming communication request, an augmented intelligence system (AIS) comprising an analytics engine to analyze certain communication data and to compute certain metrics, and a routing engine, which may use the computed metrics to connect the user, for example, to a contact center agent.

An example computer-implemented method for routing a communication request initiated by a requestor, comprises receiving, by a processor of an augmented intelligence system over a network, a transmission request from a routing engine by a requestor from a routing engine to provide an emotional exhaustion metric for each of one or more human agents in a contact center that are available to process the communication request from the requestor; receiving, by the processor of augmented intelligence system, at least one of streaming data and historical data associated with any of the one or more human agents, the communication request and the requestor, operating, by the processor of augmented intelligence system, a data analytics engine to calculate the metric for each agent based on any of the received streaming data and historical data, wherein, the data analytics engine selects and applies an emotional exhaustion model to infer a probability of each of the human agents being emotionally exhausted over a specific period of time; and transmitting, by the processor of augmented intelligence system, to the routing engine the emotional exhaustion metric for each of the one or more human agents in the contact center wherein the routing engine uses that information to route the communication request to any one of (i) one of the human agents, (ii) an automated interaction component, and (iii) a self-service capability configured to process the communication request. In some embodiments, the routing engine routes the communication request to one of the human agents, where data may be streamed to one or more human agents processing the communication request. Data collected from a communication session may be transmitted to and augmented intelligence system where it may be processed by a data analytics engine when san emotional exhaustion metric for human agents or requestors may be identified based on the streaming data.

While customer support has traditionally been provided widely via telephone calls, there is a growing demand for servicing customer or user requests using all types of available media, including telephone calls, instant messages of various sorts (text messages, short message service (SMS) messages, 'chat' messages), audio/visual communication media, web interface communication media, social media communications, exchanging of avatars and emoticons, and electronic mail (email). These various forms of media can be separated into categories, where each particular category is associated with one or more features or constraints. For example, conventional telephone calls are limited to audio communications as they do not include a capability of sharing information visually. Communications that use text messaging may be limited to text, with little or no provision for being able to share pictorial or visual data. Other forms of media have the ability to share information visually or may provide users with the ability to interact through a web interface. As such, each form of media or communication type, may be managed using metrics or protocols that consider features and constraints associated with a particular type of communication media or type of communication channel.

Increasingly, centers that received large amounts of customer inquiries rely on forms of augmented or artificial intelligence (AE) systems that are commonly used as a front line that attempts to resolve customer issues without need for human interaction. Of course, many communications received by such centers (commonly referred to as call centers) still require a real live person or agent to resolve customer issues.

Methods and apparatus consistent with the present disclosure are directed at improving the routing of communications to appropriate resources, whether those resources include augmented/artificial intelligence (AI) system or live personal agents that are tuned to the features and constraints associated with any particular type of communication channel or media. Such methods may identify, track, or compute metrics that may be used to more efficiently route user communications to a resource that can best resolve issues efficiently in a world that includes multiple different types of communication channels/media types.

AI systems consistent with the present disclosure may include a processor that executes instructions out of a memory when information included in or associated with a communication is evaluated. Such an AI system may identify or compute metrics that can be used to route communications to particular resources, this may be based at least in part on a media/channel classification associated with a communication type. Each form of communication media or channel may be associated with a media classification. An audio only communication channel may be limited to audio only communications and a text messaging communication channel may be limited to written communications, for example. Other forms of communication media types/channels may be more versatile, for example an audio/visual communications channel and a web interface communication channel can potentially use both audio and visual communications when identifying information included in or associated with a particular communication request.

In certain instances data collected over time or data received in a communication stream may be evaluated by a form or artificial intelligence or AI system when an emotional exhaustion or stress metrics are identified. After such emotional exhaustion metrics are identified, they may be used in calculations to determine whether a level of stress or emotional exhaustion of a customer or of a live agent has met or exceeded a threshold level. Methods consistent with the present disclosure may be implemented in a computer server or in a cloud-based computing system that may collect information from subscribed users. Information processed by such AI systems may include batch processing of data collected in real-time or in near-real-time. Information collected and evaluated continuously over short time spans (e.g. within milliseconds or seconds) may be referred to as real-time data and information that is collected and evaluated over longer time spans (e.g. within minutes) may be referred to as near-real time data.

Streaming Data is data that is generated continuously from one or more sources. Examples of streaming data include audio signals, mobile sensor data, and/or a sequence of mouse clicks/clickstreams that may have been received from by one or more sources. Such sources may transfer data records simultaneously to the Augmented Intelligence System. The data may be processed a number of ways, for instance it could be processed (1) incrementally using stream processing techniques without having access to all of the data or (2) processed at discrete time frames (e.g. after a caller stops talking) or (3) processed by a trigger event (e.g. volume on a call goes up). There are numerous ways to process the streaming data. In addition, it is recognized that "drift" may happen in the data which means that the properties of the stream may change over time. Drift can be used to trigger other events, such as using corrections algorithms. The result of streaming data is essentially processing big data in which it is generated by many different sources at high speed.

Data streaming can also be explained as a technology used to deliver content to devices in a call center, between call center agents and call center managers, between callers and agents and between suppliers to call centers. Data streaming allows users to access the content immediately, rather than having to wait for it to be downloaded. Data streaming also allows for reduction on data storage costs. Data streaming using real-time analysis is received data may be used to identify metrics relating to the resolution of a customer issue, for example.

Metrics associated with stress or emotional exhaustion may also be used to forecast or predict other metrics that may relate to a measure of customer satisfaction, a level of exhaustion of a live person that responds to customer calls, and probabilities that may be associated with average call handling times or with a likelihood that a particular agent can resolve an issue quickly.

FIG. 1 illustrates an example digital data processing contact center or a call center environment consistent with the present disclosure. FIG. 1 includes a contact center digital data processing system 100 comprising an intake processing system (IPS) 140, an augmented intelligence system (AIS) 150, a routing engine 160, one or more automated response technologies 130, self-service capabilities 120 and human agents 110. Human agents 110 may be equipped with phone 115A or with computer 115B that they may use process the communication requests routed to them.

As illustrated, a requestor (e.g., a customer, prospective customer, member etc.) 180 may send a communication request to the contact center over a network through a channel (e.g., voice, fax, SMS, web etc.) 190 using a communication device (not illustrated in FIG. 1) that may be a computing device (e.g., laptop, computer, tablet), mobile device, telephone, computer, voice over internet protocol (VoIP) phone, or the like, that may be associated with the individual. One or more public networks (e.g., a public switch telephone network or PSTN or the Internet) 170, local area networks (LANs), wide area networks (WANs), metropolitan area networks (MANs), closed or private networks or any other similar communication network may be used when methods consistent with the present disclosure are implemented.

Incoming communication requests from requestors 180 may be received at contact center 100 may be routed by a routing engine 160 after being received by intake processing system (IPS) 140. IPS 140 may include one or more pieces of computer hardware and software components. In certain instances, hardware and software associated with IPS 140 may be configured to perform operations with certain types of communication media or channels. For example, requestor 180 may initiate a communication request with an organization through a phone call over a public switched telephone network (PSTN) via a Private Branch Exchange (PBX) when preparing to communicate with contact center 100. Such a PBX may include a call answer unit and an interactive voice response unit (IVR) that permits the requestor to select options in response to prompts using a touchtone keypad or voice, for example. The IVR may be communicatively coupled with a database that contains data about customers of an organization, this information may include account information and customer historical information. Based on the options selected by the requestor and/or data associated with a communication request (CRM) data, the IVR may identify that requestor 180 is an existing customer that is initiating a new communication request. In such an instance, data received from the customer may be used to identify that customer 180 has a goal of changing their home address on their account. The IVR may then pass this customer information and the associated goal to any one of a contact center agent 110, a self-service capability 120, or to an automated response entity 130. An IVR may generate voice responses using a voice response unit (VRU), construct a response that may be sent by email, or may communicate with requestor 180 by other means based on decisions that may be made by routing engine 160. As such, routing engine 160 may act as an automatic call distributor (ACD) or a business rules engine (BRE)). The routing engine 160 may make communication routing decisions based on decision logic that that makes decisions based on one or more metrics, pieces of information, or goals associated with particular communication requests.

In some embodiments, a routing engine 160 can identify and connect a user to an appropriate agent using one or more techniques, that may directly route message to resources (e.g. artificial intelligence or human) that is best suited to address a particular communication request. Techniques used to route calls may be associated with different types of protocols that may be called direct routing, least-idle routing, least-occupied routing, skills based routing, dynamic routing, or business rules routing. Direct routing may include requestor 180 directly dialing a particular live agent, least-idle routing may include transferring a communication to an agent that has been idle a longest period of time, least-occupied routing may include transferring the communication to an underutilized live agent, skills-based routing may include routing the communication to a live agent with a highest skill level, dynamic routing may include routing the communication to back-up agents, and business rules routing may include routing communications from premium customers to a live agent with a highest level of skill.

In some instances, a routing engine 160 may receive information from the AIS 150 that can be used to route a communication request from the requestor 180 based upon historical and/or real-time emotional exhaustion metrics. The AIS 150 may communicate historical and/or current emotional exhaustion metrics for one or more agents in a contact center to the routing engine 130 which may, in turn, use that data combined with one or more factors to optimize routing, workforce utilization, or other key performance indicators. For example, routing engine 160 may recommend agents 110 which have previously taken a call from a particular requestor. Alternatively routing engine 160 may route a communication to agents with experience handling requestors 180 with similar emotional exhaustion metrics. Once a communication request is forwarded to AIS 150 via the IPS 140, the requestor's historical data may be historical data of available agents. An agent with a high success rate with similar requestors and/or communication requests may be selected when associated emotional exhaustion metrics meet certain thresholds. After a particular agent is selected, the communication request may then be transferred to the selected agent.

In certain instances, a requestor device may interface with the contact center PBX using a session initiated protocol (SIP). The SIP is a communications protocol for controlling multimedia (e.g., audio dialog) sessions such as internet telephony, voice and video calls, and the like. Also, some embodiments may be extended to WebRTC which allows for multi-channel interactions e.g., voice, chat and video etc.

In other embodiments, a requestor may initiate a communication request with an organization through the web channel over the Internet 170 by accessing the organization's website on their computer and initiating a chat session with a chat bot or another automated chat assistant. In this scenario, the intake processing system 140 may include a web server that hosts an organizational website along with operating one or more other technologies for chat, text analytics and search capabilities. Also, such a web server may be communicatively coupled to a CRM database or other data store that stores customer data, customer prospects, or other individuals who may have previously interacted with the organizational website. Based on the user's initial selection of chat bot as the preferred channel of communication, the IPS may pass that selection information along with other data (e.g., browser session information) associated with communication request through to the routing engine 160. The routing engine 160 may then route the request to the automate response chat bot technology 130 based on the requestor selection, where to begin interacting with the requestor. As the requestor enters more information about themselves and their goal(s) in a chat session, a text analytics component may be used to parse the inputs typed by a requestor. This information typed by the requestor may be combined with the one more other data. For example, typed requestor information may be combined with browser session information that may be used to identify the requestor, an account associated with the requestor, an interaction history, or and goals associated with a communication when a CRM database is searched for relevant information. During the requestor's chat interaction, the requestor may initiate a request to be transferred to a human agent from the automated chat assistant. At that point, the IPS 140 may pass along requestor, goal, and other information associated with the communication request to routing engine 160. Routing engine 160 may then, route the communication request to an agent using decision logic that uses that communication request information as input.

Besides the aforementioned web and voice channel examples, the IPS may combine one or more other hardware and/or software components that vary depending upon the other channels, devices and/or networks associated with the communication request. For example, written communication requests sent through, SMS, email and/or fax may involve the use of SMS applications/gateways, email and/or fax servers, respectively, that may also deploy or operate with natural language processing (NLP) and/or natural language understanding (NLU) technologies to parse and/or analyze the written text and identify the requestor and/or goals associated with the request. Still other combinations of hardware and/or software technologies are possible for the IPS 140.

An embodiment of the invention may be directed to improving communication routing and performance in contact centers by interfacing or otherwise communicatively coupling an Augmented Intelligence System 150 (AIS) with the IPS 140, Routing Engine 160, and/or the one or more hardware and software components that comprise self-service 120 capabilities of data processing system 100. Automated response technologies and/or systems or devices used by the human agents 110 may also be received communications from routing engine 160. The routing of communications may be accomplished by transmitting information about the requestor and other communication request information to the AIS 150. AIS 150 may include one or more data analytics engines that process or otherwise utilize transmitted information along with other historical and/or streaming data to compute emotional exhaustion metrics for the requestor and/or the one or more human agents in the contact center. Those metrics may then transmitted by the AIS 150 to the routing engine 160 which may use these metrics as data inputs for making routing decisions. Such decisions may be made by logic that optimally matches the requestor's communication request with one of the human agents 110, self-service capability 120, or automated response technologies 130. Furthermore, any metrics associated with a particular request may be passed to whichever request processing resource (110, 120 or 130) that is selected to receive a particular communication request. Once the communication request is routed and a communication connection with the requestor is established, any metrics associated with the requestor can be used during that interaction to provide additional context for the communication request. In addition, data associated with such interactions may be transmitted back to AIS 150 to update the emotional exhaustion metrics or other metrics associated with requestor 180, agents 110 in real-time or in near-real time. In certain instances, information associated with a communication request may be processed as part of a batch process.

The data analytics engine may perform a combined analysis of the words and/or text associated with a communication request as well we as the corresponding behavioral metrics associated with that same request as inputs into an emotional exhaustion model that computes an emotional exhaustion metric for a user (e.g., a requestor or an agent). For example, the phrase "No" could be transcribed or otherwise recognized, and also the pitch determined to be "high" along with the loudness such that it may be inferred that the user is emotionally exhausted. On the other hand, the same word "no" could be transcribed or otherwise recognized but the pitch is normal, timing is normal and loudness is below a certain threshold indicating that the user is not emotionally exhausted. It should be noted that certain 'negative' words could be an indication that an emotional exhaustion level has been exceeded.

In certain instances, routing engine 160 may receive information from the AIS 150 that may be used to route a communication request from the requestor based upon historical and/or real-time emotional exhaustion metrics. The AIS 150 may communicate historical and/or current emotional exhaustion metrics for one or more agents in a contact center to the routing engine 160 which may, in turn, use that data combined with one or more factors to optimize routing, workforce utilization and other key performance indicators. For example, routing engine 160 may recommend agents which have previously taken the requestors call, agents with experience handling requestors with similar emotional exhaustion metrics, etc. Once the requestor is forwarded to the AIS 150 via the IPS 140 the requestor's historical data can be compared with the historical data of available agents. An agent with a high success rate with similar requestors and/or communication requests may be selected if the emotional exhaustion metrics meet certain thresholds and the requestor is transferred to the selected agent.

In an instance where an AI system initially receives an audio only communication request, that AI system may first receive verbal information from a person that identifies that they have an issue with an appliance in their house that they wish to resolve, for example. An AI system receiving such a call may communicate with the caller by providing a series of questions and by receiving answers to those questions from the caller. Such an AI system may provide these questions using a human voice and receive answers via an audio communication channel where a communication system at the AI system identifies caller responses using voice recognition techniques known in the art. As such, the AI system/caller interaction may include the following dialogue that is an exemplary communication using a voice only communication channel. The following is an example for a Voice Only Communication Channel:

AI System: "What issue can I help you with?"
Caller: "My refrigerator is not cold."
AI System: "What is the make and model of your refrigerator?"
Caller: "My refrigerator is a Kenmore 789125."
AI System: "Does a light com on when you open the door?"
Caller: "No."
AI System: "Please check your refrigerators electrical plug. Is plugged in? If no, please plug it in as see if the light turns on when you open the door and then let me know."
Caller: "Thank You, yes it works now!"
AI System: "Nice working with you. Do you have another question or concern?"
Caller: "No."
AI System: "Great, thank you for calling, bye."

Note that the voice only communication channel example above allows the AI system to converge to a solution after the AI system performs voice recognition on at least the words in italics above. In such a process, the AI system after identifying certain words or phrases in response to a first question, may identify a second question based on a routing associated with the AI system, where subsequent questions or comments from the AI system vary based on responses received from a caller. As such, an AI system may alternatively, in an instance where the caller provided a different set of answers, identify that the caller's refrigerator was not cold because a refrigerator setting was not set properly and may instruct the caller to change that setting when converging to a solution. Each of the answers received by an AI system may correspond to one or more metrics that the AI system may use to calculate thresholds, probabilities, or other metrics that may be used in routing decisions. In an instance where the AI system does not converge to a solution within a certain amount of time, within a certain number of questions, or when the AI system has exhausted all relevant resolution routes, that AI system may route the caller to a live human agent for further action.

Alternatively or additionally, an AI system may identify metrics associated with the voice of the caller, were certain types of comments, intonations, or tones uttered by the caller when identifying whether the caller was stressed or may be suffering from emotional exhaustion. In an instance where the AI system identifies that a caller is emotionally exhausted or is stressed above a threshold level, the AI system may inform the caller that they are being transferred to a "personal expert that can best help them resolve their issue." As such, communication mediums that use audio may be sensitive to not just types of words spoke, yet may also be sensitive to tones utter by a caller or to whether certain words are spoken. For example, a change in pitch from a lower frequency to higher frequency, an increase in pitch, or a fluttering in the voice of a caller may be associated with an emotional exhaustion or stress threshold or a stressor pattern. If a number of such stressor events increases as a call progresses may, for example, may cause the AI system to forward the call to a live personal agent.

Metrics associated with voice inputs may be used to identify emotional exhaustion of an agent or a customer. Such voice inputs may be analyzed to identify current voice behavioral data that may be compared to historical trends. Such voice metrics may be related to a pitch, a tone, a spoken pace/pace change, or a vocal effort. This process may include identifying an increase in emotional labor of a person included in a communication session. For example, that fact that agent is continually readjusting and coordinating their effort to deal with a caller by remaining calm, actively listening, increasing patience, or showing empathy may be used to identify an emotional state or metric associated with that agent. Another identification that may be made using vocal queues may include an agent speaking too quickly may indicate that the agent is under time pressure or is concerned that metrics associated with their productivity could negatively impact their compensation. In other instances, words spoken by a customer currently may be compared to words spoken by that customer in previous communication sessions. As such, historical data combined with information related to a current communication session, may be used to identify whether a customer or human agent is excessively stressed or is emotionally exhausted. Such data may be used to identify that a customer is currently unusually aggressive or demanding or may be used to identify that an agent is suffering from a lack of autonomy or enthusiasm when they user more than a threshold number of scripted words. This data may also be used to make other determinations or calculations that may relate to identifying incentives, rewards, or performance metrics to associate with a particular agent.

A communication channel that relies on text only communications may proceed in a manner that is very similar to the audio only communication channel reviewed above. Here, however, an AI system receiving such a communication could only rely on textual information when making routing determinations. As such, metrics relating to a requestor stress or exhaustion level may be limited to the type of words used and not tonal or other information associated with the anomalies in the utterances of a person.

Communication channels that use a visual user or web interface may include communication routes that have a different look and feel than other types of communication channels. For example, a user interface may present information in parallel to a requestor that includes fields that can be selected by the requestor. In such an instance the requestor may make selections that identify that their Kenmore® 789125 refrigerator is not cold and then an AIs system may update the user interface to include initial comments and sub-windows that can be reviewed by the requestor. Here, an initial comment provided via the user interface may state, "If your refrigerator light does not come on when the door is open, please select an appropriate sub-menu to see instructions regarding quickly resolving your refrigerator issue." These sub-menus may include a first sub-menu that includes instruction on how to check the power cord, a second sub-menu that identifies how to check an on/off switch, and a third sub-menu that instructs the requestor to test a power socket/outlet that the refrigerator is plugged into. As such, communication mediums that use a web or user interface can provide features and benefits that are not natural to audio or text only communication medium. This in part may be because a requestor may already know that the refrigerator is plugged into a working power outlet, thereby, allowing the requestor to skip one or more steps may be required when another type of communication channel is used. Communication channels that use a web or user interface may also be associated with different metrics that can be used to identify a stress level or a level of emotional exhaustion of a requestor, for example, in an instance where a particular requestor clicks through many different sub-menus or when that requestor reputedly selects a particular sub-menu, an identification can be made that the requestor stress or emotional exhaustion level is above a threshold level and that communication can be passed to a live personal agent for resolution based.

Email may also be associated with different features and constraints. A feature associated with email is that attachment documents and web links may be provided with them. Of course, attachments and web links may also be associated with risks that include potentially being exposed to a computer virus. Limitations associated with email include time delay, communications are more likely to be routed to a junk email box where they may not be read, and they provide limited or no sense that requests are being reviewed in real or near-real time. Of course, instructions provided in an email may inform a requestor of other communication mechanisms that may be used by the requestor that may provide more timely responses to their requests.

When audio and video communication channels are used, requestors may experience features and benefits that include metrics associated with each of audio, text, and web/user interface communications. This is because an audio/video channel may provide access to vocal cues provided by a requestor and may provide selections that may be reviewed via a display interface. Communication channels that combine both audio and video may, therefore, benefit from new features, such as being able to answer a question provided visually by speaking. Here again, stress level of emotional exhaustion levels may be identified by using techniques used with both audio channels and with web/user interface communication channels discussed above.

While stress or emotional exhaustion metrics may be incorporated into methods and apparatus consistent with the present disclosure, other metrics that may be used include informational metrics, effort metrics, customer satisfaction metrics, performance metrics, or productivity metrics, for example. Information metrics may identify a make or model of a product, may identify a problem, or identify a location where a particular issue is being experienced. Effort metrics may be used to track how much effort either a requestor is investing into identifying a solution or may be used to track how much effort is being spent by a response system when attempting to help a requestor to find an appropriate response to their request. Productivity and performance metrics may be used to track the success or failure of specific human agents that work at a contact center.

The various metrics described, herein, may be used to calculate other metrics when a support system routes certain specific communications to particular resources dedicated to servicing requestors. A requestor effort metric may be incremented each time a requestor answers a question or selects a sub-menu, for example. A system effort metric may be incremented each time an automated assistant or a live agent provides information or questions to a requestor. In such instances, such a requestor effort metric or system effort metric may be included in a calculation of an overall stress score that may include other metrics, like those discussed above. Such an overall stress score, when it reaches a threshold level may be used to identify that the communication should be passed to a live agent. A live agent may be assigned the communication based on a score associated with that particular agent. Such agent scores may be calculated using a productivity metric, a performance metric, a satisfaction metric, or another metric associated with that particular agent. The various scores or metrics discussed above may be updated overtime, where historical data is stored in a database/memory that may be accessed by an AI system when communications are routed. This may allow the AI system to identify that a particular requestor could best be serviced by a particular live agent based on historical data associated with either the requestor, with the agent, or both.

Alternatively or additionally, stress or emotional exhaustion of an agent may be identified and when a level of stress or emotional exhaustion is identified as having met a threshold, using calculations associated with received audio, text, or video information. The processing of real-time video data may include calculating an emotional exhaustion metric using facial recognition data and behavioral data gathered through the video stream. The video stream data may be sent to the AIS 150 via the IPS 140 of FIG. 1 in order to compute an emotional exhaustion metric level through data analytics encompassing the facial recognition and behavioral data from the video stream combined with the voice data in order to provide individuals (e.g., an agent and/or a requestor) with recommendations or insights that would include the facial recognition and/or behavioral data. For example, video data that may include facial recognition and behavioral data, may be collected prior to a time when a requestor communicates with an agent. This may allow the AIS 150 to calculate an emotional exhaustion level prior to an interaction between the requestor and the agent. This data may be continued to be collected during such a requestor/agent interaction. Additionally the voice data may be used when an overall emotional exhaustion metric is identified. As such a stress score or an emotional exhaustion score may be based on facial recognition data, behavioral data, and voice data. An analysis off of this information may be used to inform an agent of suggestions during the requestor/agent interactions in real time. For example, the agent may receive recommendations that inform the agent to speak at a slower pace, be more sincere, etc. In addition, the calculated metrics collected prior to the requestor/agent interaction may be used by the AIS 150 to provide data analytics to the Routing Engine 160 to pair the requestor with a more compatible agent based on the emotional exhaustion levels determined by the facial recognition data and/or behavioral data.

IPS 140 of FIG. 1 may also detect the requestor's language and based upon the language of the requestor use a specific emotional exhaustion model. The IPS 140 may detect the language and send an alert to the AIS 150 to use the correct emotional exhaustion model when creating outputs for the event. This would provide more accurate outputs since variations in speech patterns (tone, pitch, pace, etc.) in different languages can lead to different conclusions. The language may be detected by the IPS 140 by a numerical input from the requestor. For example, "for English press 1, for Spanish press 2" etc. This step may occur when the IPS 140 is identifying the requestor and/or associated goals prior to being forwarded to the AIS 150.

Figure 2:
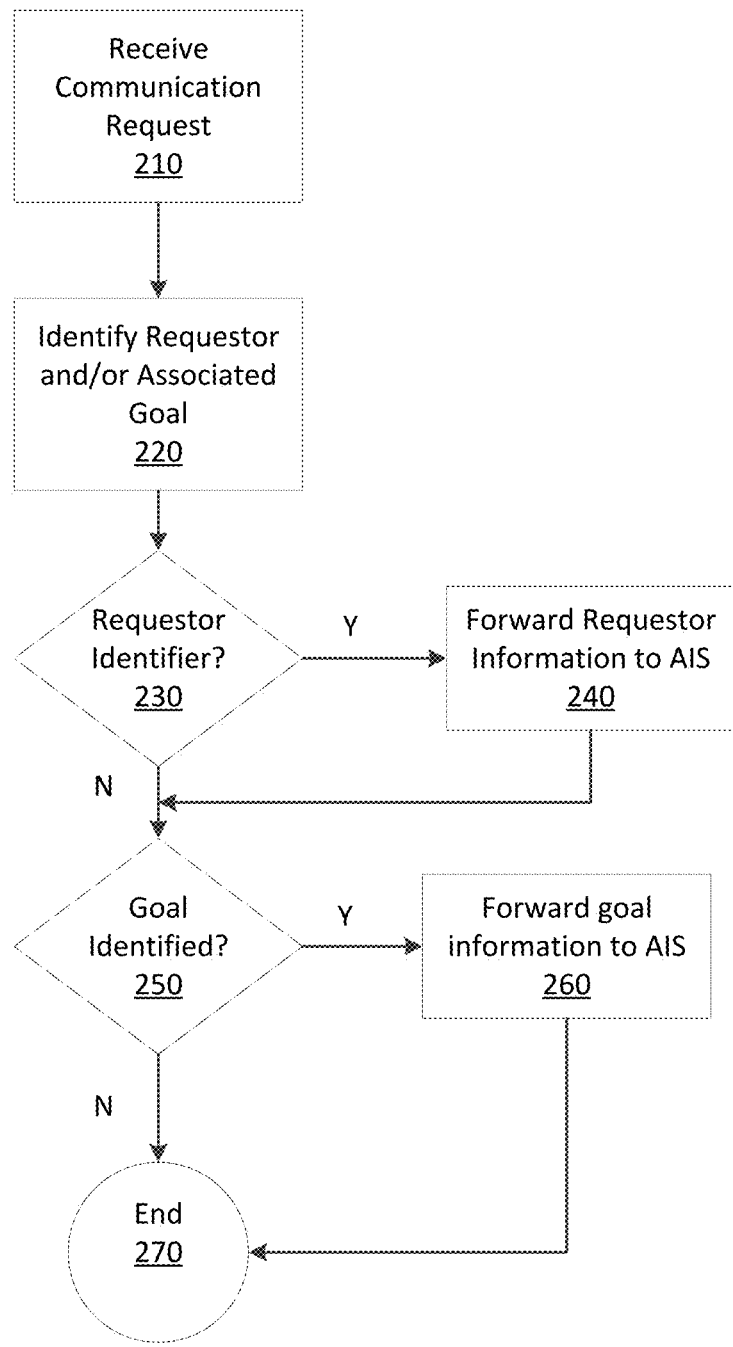
FIG. 2 illustrates an exemplary set of steps that may be performed by apparatus consistent with the present disclosure.

FIG. 2 illustrates an exemplary set of steps that may be performed by apparatus consistent with the present disclosure. The steps illustrated in FIG. 2 may be performed by an intake processing system/server (IPS) like IPS 140 of FIG. 1. In a first step 210 of FIG. 2, a communication request is received at a communication/call center and then in step 220, one or more identifications may be performed. For example, step 220 may identify the identity of a customer that provided the communication request and one or more goals associated with the received communication request.

After step 220, determination step 230 may identify whether the communication request was received from a known requestor. Such a determination may be made using an identifier associated with a previous customer, for example. When determination step 230 identifies that the communication request has been received from a known requestor, program flow may move to step 240 where information related to that known requestor may be forwarded to an AI system consistent with the present disclosure.

After step 240 or after step 230 identifies that the communication request is not from a known user, the program flow may move to determination step 250. Determination step 250 may then identify any goals that may be associated with or included in the communication request. Determination step 250 may then identify whether any goals are associated with the communication request; when not, program flow may move to step 270, where the flow chart of FIG. 2 ends. When determination step 250 identified one or more goals associated with the communication request, program flow may move to step 260, where goal information may be passed to an AI system consistent with the present disclosure. After step 260, the flow chart of FIG. 2 ends in step 270. While FIG. 2 illustrates the ending of program flow in step 270, AI systems or routing engines consistent with the present disclosure may perform additional steps where the AI system may communicate with the requestor or a routing engine may route the requestor's communication to a human agent.

In certain instances, an intake processing system/server (IPS) may follow the same process illustrated in FIG. 2 but may directly pass along the output of that process (e.g., requestor identity, one more goals and/or other communication request data) to a routing engine rather than transmitting the output of the process to an automated intelligence system (AIS). In such a scenario, the routing engine may then transmit data (e.g., a query or data request along with the communication request data it received from the IPS) to the AI system immediately or after some time when it is ready to route the communication request. Upon receiving such a query, a data or transmission request may be sent from the routing engine, after which the AI system may calculate the requested metrics and transmit the information to the routing engine such that the communication request will be sent to an appropriate resource for processing.

In an example, where an IPS interfaces with a routing engine through an AI system, a process utilizing the technologies described herein may be performed. Here again the IPS may receive a communication request sent by a requestor (e.g. a customer) via a communication network. In some embodiments, the communication request may comprise a combined audio-video communication sent over the web. In such an instance, the IPS may processes the communication request as illustrated in FIG. 2. Output data may then be transmitted to an AI system for further processing. The AI system may process the data received from the IPS according to one or more models used to identify an emotional exhaustion metric or an exhaustion/stress score of a customer. Alternatively or additionally, the AI system may calculate a measure of emotional exhaustion (e.g., a score) for each of one or more agents using the data analytics engine. Such calculations may be performed using historical data, streamed data, or other data associated with a communication request. In some instances, emotional exhaustion metrics of the customer and/or each of the one or more agents can be transmitted to a routing engine. The routing engine may then use the emotional exhaustion metrics of the customer and/or agent as input variables for one or more customer-agent matching processes.

In another example, where an IPS interfaces with the routing engine directly, a process utilizing the technologies described herein may include a communication request sent by a customer that is received by the IPS via a communication network. In some embodiments, the communication request may comprise electronic text communication. The IPS may then process the communication request as illustrated in FIG. 2, when the IPS generates output data. This generated output data may be transmitted to routing engine. In certain instances, such output data may include information from a customer response database (e.g., from a CRM database). This output data may indicate that a particular requested communication may be challenging for a handling agent. When this is the case, the routing engine may communicate with AI system to request metrics relating to trends in emotional exhaustion of the requestor as well as each of the one or more agents over the last one hour, when trend information in reviewed within a last few minutes may indicate that a stress or emotional exhaustion threshold has been crossed. In such instances, the AI system may transmit the requested data back to the routing engine and the routing engine, in turn, can then use metrics related to the requestor or each of the one or more agents as input variables for one or more customer-agent matching processes.

Systems and techniques described herein can be used to improve communication performance and routing in multiple ways. As mentioned above, it improves existing routing engine technology by enabling more precise matching of requestors' communication requests with human agents. These systems and methods may also be used to provide automated responses via self-service capabilities of the data processing system 100 of FIG. 1. In addition, since the requestor's emotional exhaustion and other related metrics can be computed and passed along with the routed request, these methods provide better contextual information to automated systems or to agents such that customers can be served better. Such systems and methods may also allow contact centers to better manage their work queues of communication requests while providing a healthier and more productive work environment for their agent staff by minimizing their work stress. This, in turn, may reduce agent churn/turnover rates and may improve other contact center operational metrics, such as customer satisfaction scores.

Figure 3:
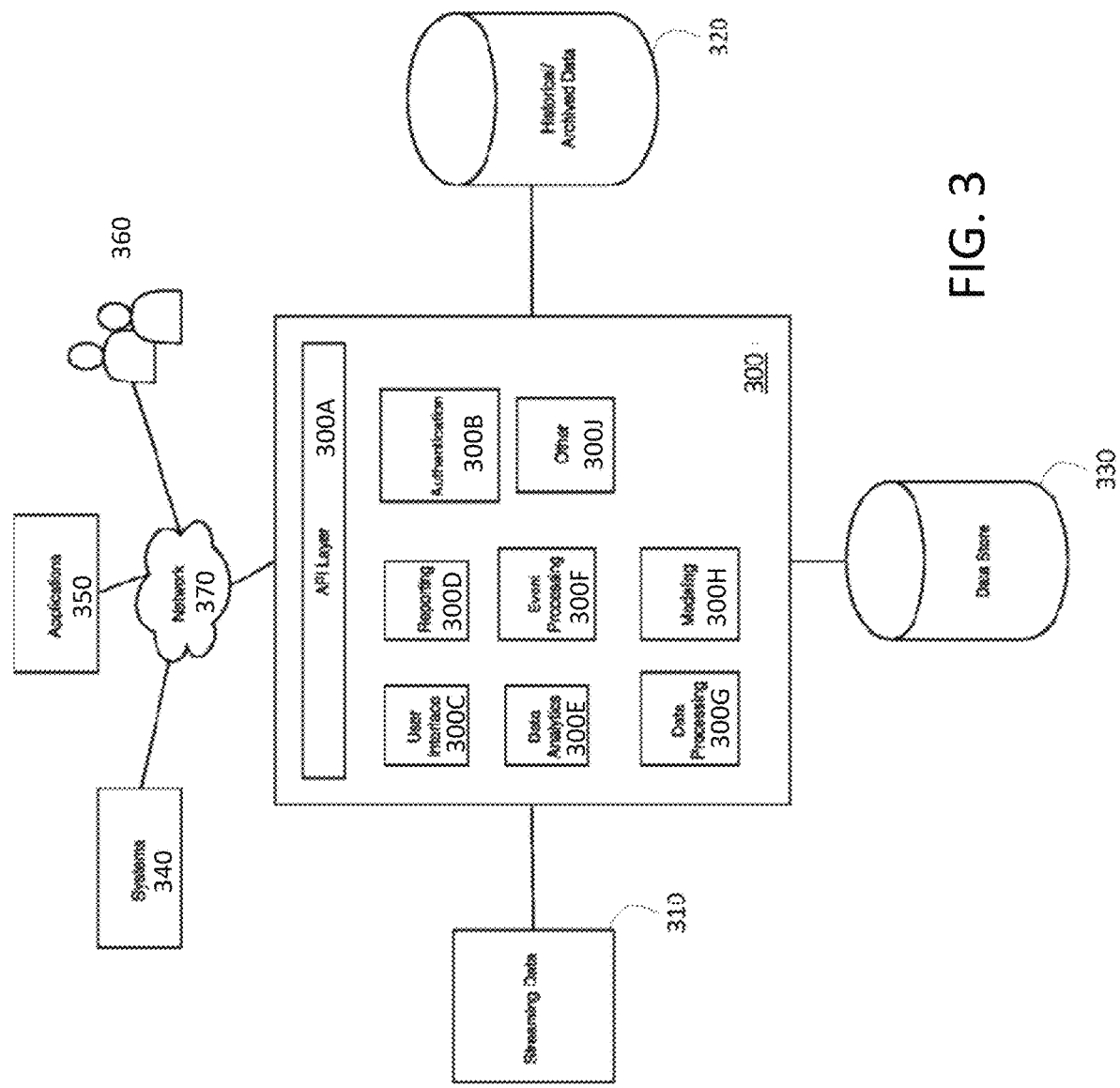
FIG. 3 illustrates an exemplary augmented or artificial intelligent system (AI) system consistent with the present disclosure.

FIG. 3 illustrates an exemplary augmented or artificial intelligent system (AI) system consistent with the present disclosure. FIG. 3 includes an AI system 300 communicatively coupled to data streams 310, data store 330, and historical data archive 320. FIG. 3 also identifies that AI system 300 may be coupled to systems 340 and application systems/programs 350 via network 370. Persons 360 may include either customers or human agents that may interact with each other according to methods consistent with the present disclosure.

Note that AI system 300 includes an application program interface (API) layer 300A, authentication software 300B, user interface 300C, reporting software 300D, analytical software 300E, event processing software 300F, data processing capabilities 300G, models 300H, and other hardware/software 300J. API layer 300A may provide a capability for users 360 of systems 340 or application 350 to communicate with AI system 300 via user interface 300C. As mentioned is respect to the various figures of the present disclosure, AI system may include a processor that executes instructions out of a memory to authenticate users (customers or agents), perform data processing tasks, compute data/analytics, make determinations regarding identified events, or generate reports according to one or more computer models. Alternatively or additionally other computer hardware or software 300J may be used to perform calculations and determinations consistent with the present disclosure.

AI system 300 may receive data from and/or transmit data to an internal or external data storage device 330. An AIS 300 may receive and/or receive streaming data 310 and/or historical or archived data 320. In some embodiments, AIS 300 may be directly connected to a network, 370.

AI system 300 as described herein may include or may be connected to one or more platform components or services that may include application programming interface (API) 300A that facilitates integration with other applications or services, a user interface 300C (that may be a graphical user interface (GUI)), machine learning and/or artificial intelligence component, an output or reporting module 300D, authentication module 300B, a data processing (Streaming and/or historical/archived data) module 300H, an encoding and/or computation module, a video/audio/text analytics module, an event handling module, and/or a storage module 330.

In some embodiments, a AI system 300 can be used to optimize communication routing and performance, call center environment 100 of FIG. 1. In some embodiments, AI system 300 comprises a data analytics engine 300E that may calculate one or more output metrics from input data. As such AI system 300 may use processing capabilities to analyze user behavior when exhaustion metrics are identified.

An emotional exhaustion metric associated with agents and/or requestors can be used as a data input for decision logic used in one or more routing engines at a call center (e.g. at an Automated Call Distributors). Decision logic may also use one or more business rule engines in a multichannel contact center to better manage work queues and route communication requests more efficiently across different types of communication channels.

In certain instances, an emotional exhaustion metric associated with a first agent may be combined with an emotional exhaustion metric of a second agent to be used as a data input for decision logic used in a routing engine. In such an instance, the emotional exhaustion metric of a first agent may be computed and/or stored by the AI system 300 and combined with the emotional exhaustion metric of a second agent by the AI system 300 when a communication request from a customer is evaluated in order to create emotional exhaustion metrics consistent with the present disclosure. The combined emotional exhaustion metric may be used to provide a supervisor with a summary of information that may be used to identify how the agent can provide better services to customers than the second agent. This information may then be used to instruct the second agent about how he can improve.

Emotional exhaustion metrics may also be used to forecast future performance of the contact center operation performance metrics, including but not limited to customer satisfaction (CSAT) score, a customer and or agent churn/turnover rate, first call resolution (FCR) rate, an average handle time (AHT), or other metrics. In some instances, data derived from or associated with an agent is used to assess exhaustion, a feeling of being emotionally drained, or a lack of energy. Data derived from or associated with a requestor may be used by AI system 300 to assess exhaustion. Such operational metrics have specific levels that need to be maintained by an agent. These maintenance levels may be accessible to the AIS 300 via data store 330 or historical data archive 320. In an instance where an average handling time of 10-20 minutes per communication request is common and this average handle time threshold is exceeded, then the emotional exhaustion metric may be computed to determine whether stress or emotional exhaustion is affecting the word of an agent. AI system 300 may then identify possible solutions to the agent's slow average handing time in real or near-real time.

Emotional exhaustion metrics of an agent or requestor, may be compared to similar historical emotional exhaustion data accessible to the AI system 300 when forecasts are made regarding the future performance of an agent. This forecast or prediction may lead to certain interventions or notifications to the agent. For example, the agent may be provided with insights or recommendations via a user interface. Alternatively or additionally audio or video feedback may be provided to an agent when that agent is tutored. This may help that agent achieve key performance targets, keep a requestor's emotional exhaustion metric below a certain level, or to more rapidly achieve a goal associated with a requestor. An such, AI system 300 can use data analytics from a current event or communication request and compare this data continuously against historical emotional exhaustion metric data of similar events in order to provide the agent with appropriate interventions or notifications in light of the desired outcomes for the communication requests, operational targets for the contact center or other goals. As such, AIS 300 may analyze historical emotional exhaustion metrics by predetermined time intervals and store emotional exhaustion metrics associated with communications between an agent and a requestor. This could allow the AIS 300 to store the changes in the emotional exhaustion metric based on the previous communications between a requestor and agent. Information related to the interventions or notifications can be linked to changes in the emotional exhaustion metric over time. Details associated with a particular communication request may be used to identify that a similar event is likely to occur in the future and the AIS 300 can identify a corrective action before a forecasted change in the emotional exhaustion metric is realized. This may help provide agents with the ability to achieve one or more desired goals more easily. In some embodiments, optimization of contact center communication routing via automatic call distribution that could be performed by the data analytics engine 300E. This may also be used to generate one or more models that may be able to infer measures of customer effort based on a combination of metrics or factors. Such combined metrics/factors may include metrics or factors related to:

A. An amount of effort expended to date to try and accomplish one or more goals associated with the communication request.

B. A an amount of effort required to accomplish one or more goals associated with a communication request.

C. A measure of emotional exhaustion measure for an agent at a specified period of time.

D. A measure of emotional exhaustion of an agent or customer.

Measures of emotional exhaustion for an agent at a specified period of time may be a function of incoming/outgoing traffic, measures of an amount of time related to a customer support issue. A first time based metric may be associated with the fact that a customer is currently participating in a live call with an agent. A second time based metric may be associated with scheduling a future call with a customer or may be related to a queue that stores customer request information. Measures of emotional exhaustion for a customer may include a period of time that the customer has invested in a communication or may be related to a time when a particular communication was sent in the case of an email communication.

Described herein are technologies related to electronic communication routing, e.g., using an Augmented Intelligence System (e.g., cloud-based or on premise) that can consume streaming and/or historical/archived data to calculate and publish (through an API layer, for example) an Emotional Exhaustion metric for an individual who subscribed to the system or is otherwise associated with the system such that the individual's data is accessible to the system for analysis. The system can support real-time, near-real time and batch processing use cases depending upon how the output is being consumed by users, systems, and/or services that interact with the system.

In some embodiments, data may be received, processed and/or transmitted by AIS 300 using real-time processing. In some embodiments, real-time processing may use continuous input, processing and output of data. In certain instances, only response times in milliseconds or seconds may be acceptable. In such instances, real-time processing may be used in connection with streaming data such as from device and mobile sensors, web clickstreams, social media, real-time audio and video.

Data may be processed by AIS 300 in near-real time. As such, speed may be important but slightly delayed response times in minutes instead of milliseconds or seconds may be acceptable. Input data may be collected immediately in response to certain events, actions or triggers, but the Augmented Intelligence System can be programmed to process the data and respond with a certain delay (e.g., every few minutes, hours, or days). Near-real time processing may be used for data processing or complex event processing, or a combination thereof. Complex event processing (CEP) combines data from multiple sources to detect patterns and attempt to identify either opportunities or threats. The goal can be to identify significant events and respond fast, for example sales leads, orders or customer service calls.

Data may be processed using batch processing the system and techniques described herein. In some embodiments, data processing may be even less time sensitive than in methods where near-real time processing may be applied (e.g., where typically large volumes of data are collected and stored over days or months). Historical Data may be processed and output at one or more specified times. Batch processing can be an efficient way of processing high volumes of data where a group of transactions is collected over a period of time. Data can be collected, entered, processed and then the batch results are produced.

System 100 of FIG. 1 may comprise technologies that may be used by a user, e.g., an agent's supervisor, to intervene, e.g., before, during, or after a call, chat, SMS, email or other communication between, e.g., a customer and an agent. In some embodiments, AIS 300 may interface with a screen displayed on the agent's computer or telephone device. That screen may display (e.g., in real time), a (graphical) analysis of call center stressors, threshold for resilience factors, and/or one or more metrics for Emotional Exhaustion. In addition the metrics may be used to trigger one or more interventional measures across different modalities such as visual, audio and/or haptics feedback. By way of non-limiting examples, visual interventional measures may comprise an agent receiving an uplifting or reassuring notification on their computer screen live during a difficult customer interaction (e.g., over the phone). An audio interventional measure may comprise listening to soothing music (between calls) for individual stress-reducing technique or listening to simulated supervisor audio instructions before, during or after calls. Similarly, haptic interventional measures may comprise smart phone or smart watch alert as a reminder to take more frequent and/or different timed breaks. Still other interventional measures are possible such as the agent being routed easier calls for a specific period of time or the agent receiving incentives/rewards as part of one or more gamification elements to improve morale and performance.

A supervisor's dashboard may display (e.g., in real time), a (graphical) analysis of, e.g., call center stressors, threshold for resilience factors, a metric for emotional exhaustion, and/or notification for stress-reducing organizational change. Using individual emotional exhaustion metrics for each agent, AIS 300 may compile anonymized team metrics for supervisors to review and take action accordingly. For example, through personalized training and coaching, revised incentives and/or team assignments, revised job policies to empower agents or to provide more autonomy over break times and/or to offer incentives to irate customers etc.

An example AIS 300 is shown in FIG. 3. In some embodiments, augmented intelligence system (AIS) 300 receives and/or transmits data from or to an IPS and/or routing engine. In some embodiments, augmented intelligence system (AIS) 300 comprises one or more processors and/or instructions. The instructions, when executed by one or more processors perform one or more methods, such as those described herein. AIS 300 may include an application programming interface, a user interface, a data analytics module (e.g., one or more data analytics engines), a data processing module, a reporting module, an event processing module, a modeling module, and/or an authentication module.

A model as described herein may utilize one or more data inputs for calculating an emotional exhaustion measure, e.g., for a user, e.g., a customer. In some embodiments, a data input can be or comprise historical and/or archived data, e.g., customer interaction/communication history (e.g., obtained from data associated with or obtained from CRM)), previous interaction counts, complexity, CSAT/survey data, and/or history with different agents/teams. In some embodiments, a data input can be or comprise streaming data, e.g., web clickstreams measured during the interaction that is being routed; words spoken, heard and/or written during the current communication request as it is being routed to the agent, behavioral signals from the current communication request as it being routed as a measure of emotional exhaustion, mobile/sensor/geolocation/time of day/background noise to determine cognitive load/decision fatigue at the time of the interaction, and/or Social Media/News Feed (e.g. related to recent local events).

In some embodiments, a user's emotional exhaustion metric may incorporate background noise, such as a crying baby, dog barking, etc., to determine their emotional exhaustion levels. If the requestor's emotional exhaustion levels past a predetermined threshold, based upon the background noise, the AIS 300 may provide guidance (e.g., through interventions and/or notifications) to the agent in order to lower the requestor's emotional exhaustion levels. For example, a requestor's emotional exhaustion levels may be below a predetermined level but when a baby is heard crying, their emotional exhaustion passes the predetermined threshold. In that scenario, the AIS 300 may provide a visual notification on the agent's computer interface suggesting to the agent to speak a bit slower than normal and to offer the requestor to place the agent on speaker so the requestor can hold the baby during the communication. Similarly, if an agent's emotional exhaustion metric is computed to be higher than a pre-determined threshold due to the background noise in the contact center, a routing engine may not route relatively more difficult communication requests to that agent where the requestor's emotional exhaustion metric is also computed to be relatively higher than normal.

Examples for data inputs relating to emotional exhaustion of a user (e.g, a customer) include words spoken by agents during current interaction vs. historical trends, agent aggression/rudeness, Agent being unhelpful, customer interaction history, previous interaction counts, outcomes, complexity, customer effort score (CES) or CSAT scores, cognitive load and/or decision fatigue trends. In some embodiments, cognitive load is more of a point in time measure and can be fixed immediately. In some embodiments, decision fatigue is a resource depletion issue.

Example operational definitions of constructs are shown in Table 1.

TABLE 1

| | Inputs | Operational Definitions |
|---|---|---|
| Construct 1 | | |
| Call Center Stressors | | Objective negative stressors in the job environment. |
| | Customer verbal aggression | Caller yelling at, insulting, cursing at, and/or threatening an agent. |
| | Highly demanding customers | Caller language indicates a refusal to accept the solutions provided by the agent. (e.g. pushy or talking over agent) |
| | Decreased Job autonomy | Agent sounds like they are speaking from a script. |
| | Increased emotional labor | Agent is continually readjusting and coordinating their effort to deal with the caller by remaining calm, actively listening, increasing patience, and showing empathy. |
| | Increased time pressure because of productivity metrics | Agent feels pressured to complete a call quickly. |
| | Increased performance monitoring | Pressure to achieve organizational goals for service & rapport between agents and callers (measured by customer satisfaction and contact quality). |
| Construct 2 | | |
| Stress | | Agent's personal experiences and cognitive-behavioral reactions to call center stressors. |
| | Age | Agent's chronological age. |
| | Tenure | Agent's total length of time in current role. |

TABLE 1-continued

| | Inputs | Operational Definitions |
|---|---|---|
| | Emotion regulation | Agent's cognitive appraisals and coping responses to call center stressors (e.g. faking positive emotions or perspective taking) |
| | Perception of control at work | Agent's perception of monitoring tools used by client supervisors and client executives. |
| | Depersonalization | Agent disengages from their work and become uncaring and/or cynical towards callers. |
| Construct 3 | | |
| Emotional Exhaustion | | Agent's feeling of being emotionally drained by work and lacking the energy to maintain work effort. |
| Construct 4 | | |
| Frequent Absences | | |
| | Hours lost at work | Agent's time (in hours) spent out of the office that is not related to planned vacation time. |
| | Avoidance of tasks | Agent's adherence to schedule. |
| Construct 5 | | |
| Employee Churn | | Rate (by quarter) of agents who left the client organization and require replacement by new hires. |
| | Voluntary Termination | Agent leaves for better opportunity. |
| | Involuntary Termination | Agent is let go because of poor performance |

Data that may be used with a technology or model as described herein may include one or more behavioral signals, metrics or factors, measures of pace over a time period. As such, a "speaking rate" at which the first party has spoken and a measure of pace at which the second party has spoken may be identified and graphically charted together for comparison. Analytical tools of the present disclosure may identify rise a measure of tone or a vocal "dynamic variation". Such tonal identifying analytical tools may identify that measures of tone associated with a first person and with a second person may be graphically charted together for comparison. Such comparisons may span measurements made over an interval of time (seconds or minutes, for example). Such measures of time may be associated with a time interval, such as the previous minute, the previous 2 minutes, the previous 3 minutes, or since the beginning of the communication. Furthermore a running "instantaneous" measure over a shorter preceding period of time may also be collected and analyzed. Such shorter periods of time may correspond to a time period no greater than 10 seconds, 5 seconds, 3 seconds, 1 second, 0.5 second, 0.3 second, 0.2 second, or 0.1 second.

Other forms of data analysis and collection may be related measures of vocal effort with which the first party has spoken and a measure of vocal effort with which the second party has spoken, degrees of articulation (e.g., "articulation space") with which the first party has spoken and a measure of degree of articulation with which the second party has spoken, measures of amounts of time the first party has spoken relative to the second party (e.g., "speaking participation" or "engagement"), or a measure of conversational engagement of the parties over an interval of time. As mention above, such analysis and data collection may be performed over smaller or longer periods of time. Any analytics collected or calculated may be charted in charts when making comparisons in performance between different agents, for example.

Models consistent with the present disclosure may use one or more data inputs for calculating metrics. Such metrics may be related an amount of effort expended by a requestor, customer or agent. In some instances, received data can include historical data or archived information. Such historical data or archived information may include a customer effort score, customer survey data, information collected from one or more previous interactions with a same customer, a number of interactions, or an amount of time spent trying to accomplish a goal. Such models may be used to characterize data associated with or obtained from a customer relationship management (CRM) technology that may cross reference information received over time from different types of communication channels and that may process historical data from those different types of communication channel regarding behavior patterns of a same customer or agent. These models may parse words spoken or written during previous interactions. In some embodiments, a data input can include streaming data (e.g., sequences of questions and answers, web click sequences, words spoken or written during the evaluation of a current communication request, or include behavioral signals from a current communication. Furthermore, such models may be used when request are currently being routed by according to the present disclosure.

A model as described herein may utilize one or more data inputs for calculating a metric. For example, a metric for effort required by a customer or an agent may be computed using factors that include a number of additional steps remaining to accomplish a goal for a communication request, an amount of information communicated, or an amount of time. For example, an amount of time it typically takes to complete a task of similar complexity. These models may utilize one or more data inputs for used to calculate a level of emotional exhaustion and they may include factors that relate to: historical data, achieved data, agent availability, agent utilization, amount of user time off between calls, a number of interaction, types of interactions, context, complexity, interaction outcome or resolution, hours logged, a number of words communicated (spoken, heard, or written) during interactions; web click-stream information, behavioral signal history (from past audio interactions), and/or human resource data (e.g., agent profile, skill level, gender, language, accent, job policies, training/coaching, incentive or reward structure, goals, performance metrics). In some embodiments, a data input can include streaming data, such as voice data, voice behavioral data, web/app clickstream data, words communicated (heard, written and/or spoken words as compared to historical trends), number of application screens open at the time of a communication, a number of performance monitoring tools deployed on an agent device, an ability to collaborate with other agents, a frequency of collaboration with other agents, or such data inputs may include social media/news feed data that may be related to recent local events.

Figure 4:
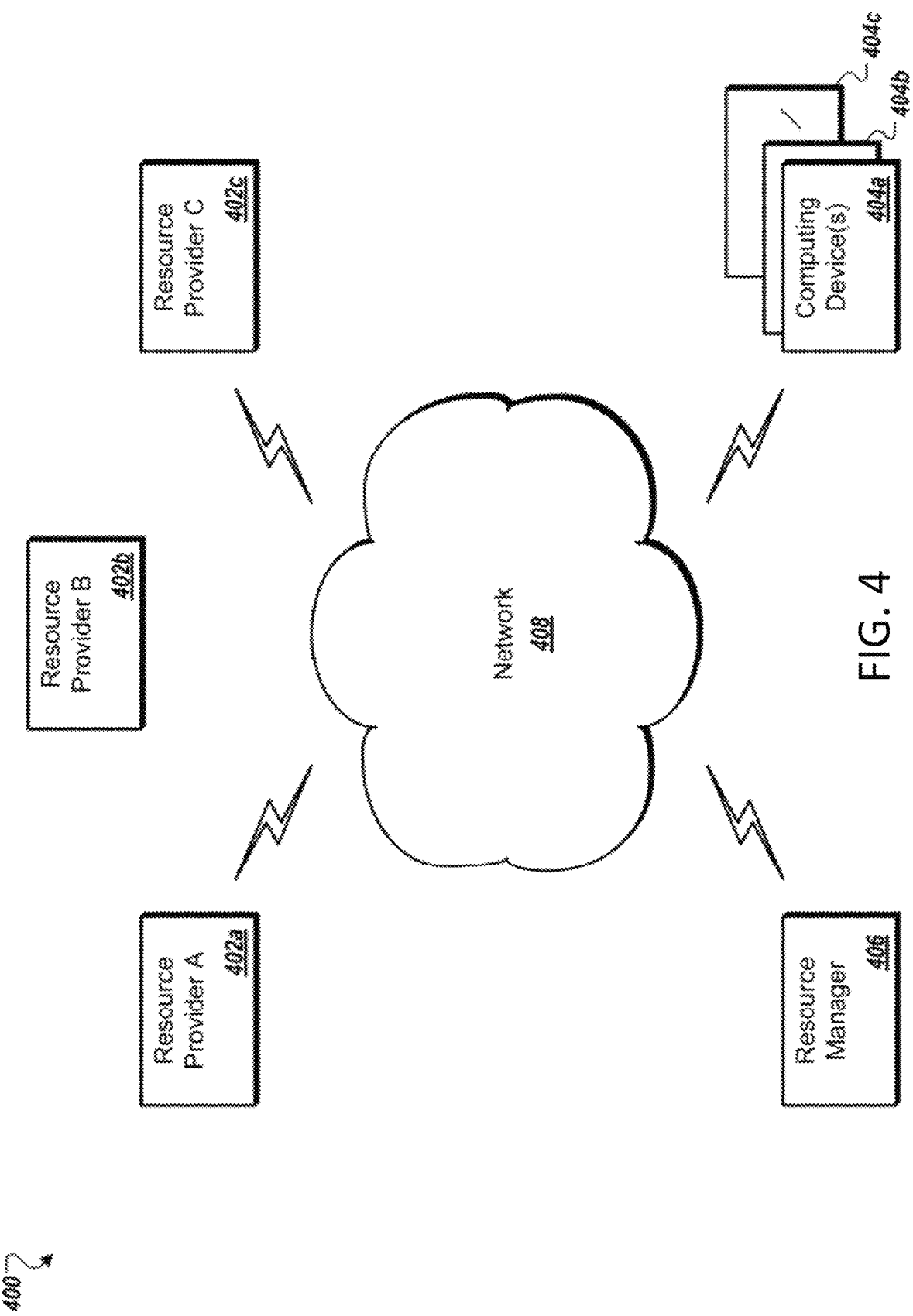
FIG. 4 illustrates a communication network that may be used to send communications between different computing devices when methods consistent with the present disclosure are performed

FIG. 4 illustrates a communication network that may be used to send communications between different computing devices when methods consistent with the present disclosure are performed. FIG. 4 shows an illustrative network environment 400 consistent with the methods and systems described herein. FIG. 4 is a block diagram of an exemplary cloud computing environment 400. The cloud computing environment 400 may include one or more resource providers 402a, 402b, 402c (collectively, 402). Each resource provider 402 may include computing resources. In some implementations, computing resources may include any hardware and/or software used to process data. For example, computing resources may include hardware and/or software capable of executing algorithms, computer programs, and/or computer applications. In some implementations, example computing resources may include application servers and/or databases with storage and retrieval capabilities. Each resource provider 402 may be connected to any other resource provider 402 in the cloud computing environment 400. In some implementations, the resource providers 402 may be connected over a computer network 408. Each resource provider 402 may be connected to one or more computing device 404a, 404b, 404c (collectively, 404), over the computer network 408.

The cloud computing environment 400 may include a resource manager 406. The resource manager 406 may be connected to the resource providers 402 and the computing devices 404 over the computer network 408. In some implementations, the resource manager 406 may facilitate the provision of computing resources by one or more resource providers 402 to one or more computing devices 404. The resource manager 406 may receive a request for a computing resource from a particular computing device 404. The resource manager 406 may identify one or more resource providers 402 capable of providing the computing resource requested by the computing device 404. The resource manager 406 may select a resource provider 402 to provide the computing resource. The resource manager 406 may facilitate a connection between the resource provider 402 and a particular computing device 404. In some implementations, the resource manager 406 may establish a connection between a particular resource provider 402 and a particular computing device 404. In some implementations, the resource manager 406 may redirect a particular computing device 404 to a particular resource provider 402 with the requested computing resource.

Resource provider 402 may each be a human agent or at least some of resource provider 402 could include computation engines or forms of augmented intelligence discussed in respect to FIGS. 1-3.

Figure 5:
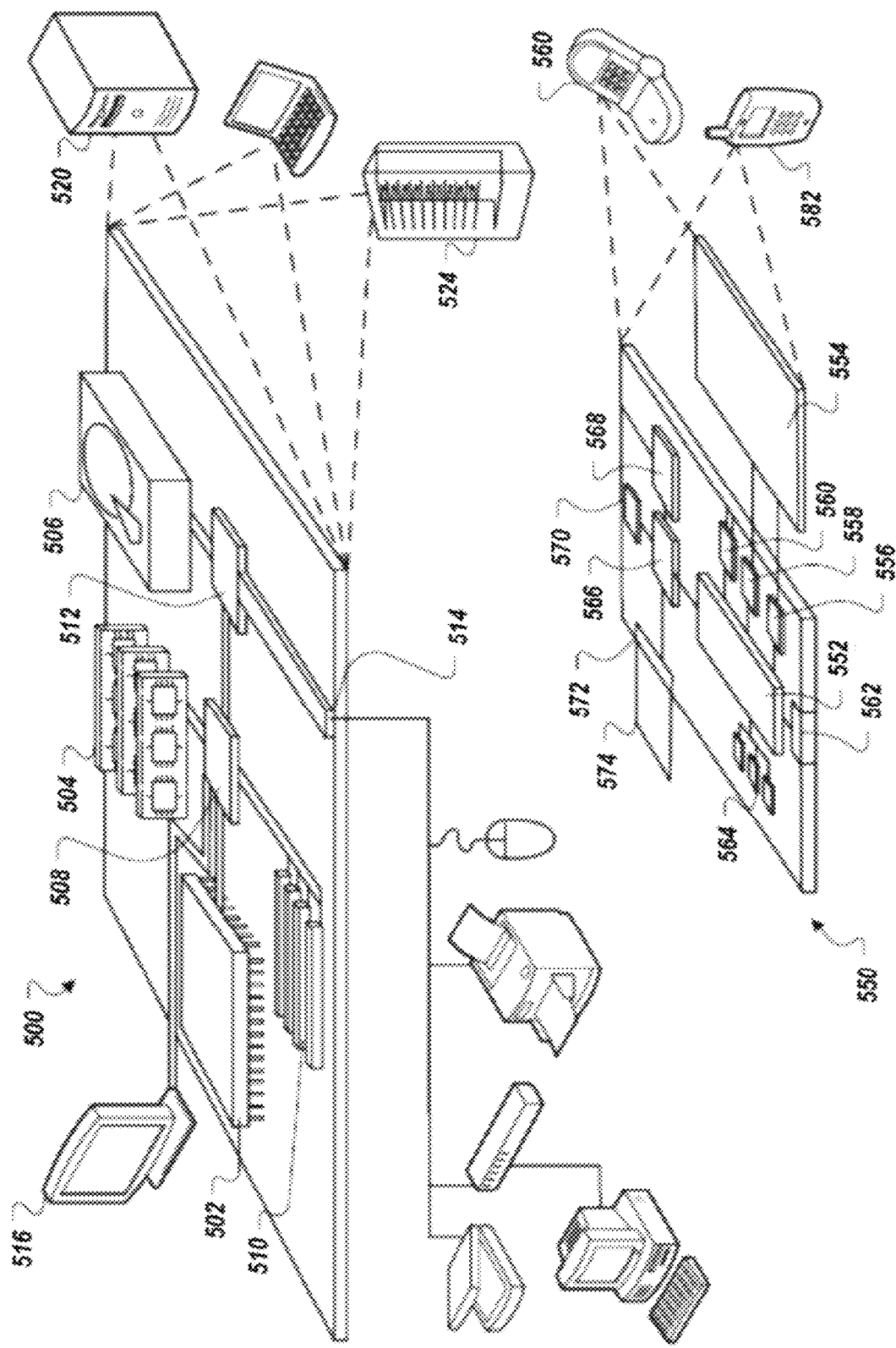
FIG. 5 illustrates exemplary computing devices that may be used to implement methods consistent with the present disclosure.

FIG. 5 illustrates exemplary computing devices that may be used to implement methods consistent with the present disclosure. FIG. 5 shows an example of a computing device 500 and a mobile computing device 550 that can be used implement method consistent with the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry when necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1068 using a radio-frequency. In addition, short-range communication may occur, such as using a Bluetooth®, Wi-Fi™, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone. It may also be implemented as part of a smart-phone, personal digital assistant, or other similar mobile device.

Figure 6:
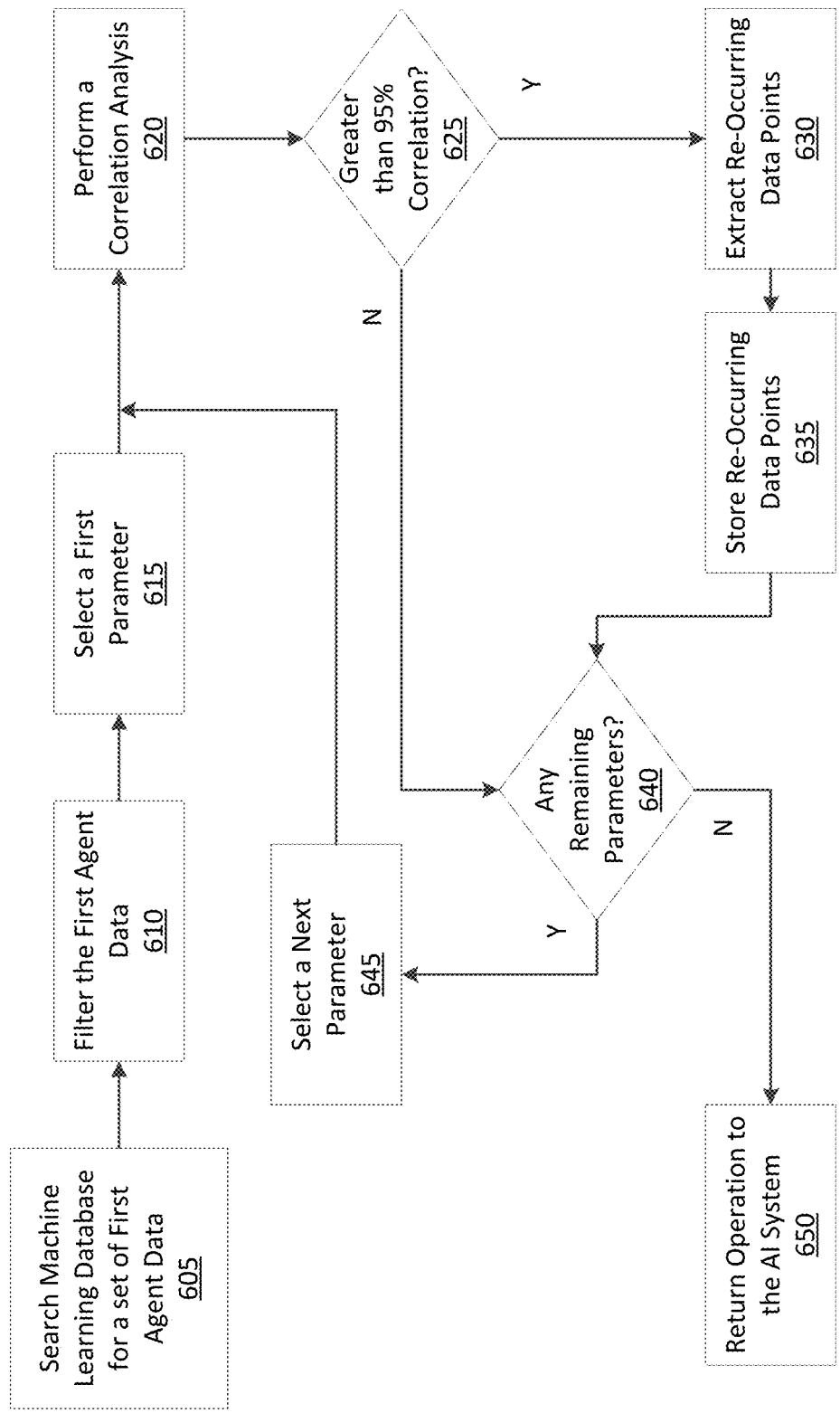
FIG. 6 illustrates a set of exemplary steps that may be performed by learning module software consistent with the present disclosure.

FIG. 6 illustrates a set of exemplary steps that may be performed by learning module software consistent with the present disclosure. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments The steps of FIG. 6 may be initiated by an augmented/artificial intelligent (AI) system consistent the present disclosure. As such, AI system 300 of FIG. 3 may cause a processor to execute instructions out of a memory to perform the steps illustrated in FIG. 6. In step 605 of FIG. 6 a processor executing instructions out of a memory may search data stored in a learning database when a first set of data is retrieved. This first set of data may be data associated with a first agent that works at a call center and may include the name or age of the first agent, emotional data, behavior data, skill level information, speech frequency data, or other data related to the first agent. Speech frequency data, for example, may be used to identify how quickly the first agent speaks may be retrieved in step 605. This speech frequency data may be used to set a historical benchmark or to identify historical metrics associated with the first agent's previous interactions with other agents or customers. Other data may also be retrieved in step 605, such as data identifying that the average frequency range for human speech varies from 80 to 260 Hertz, he vocal speech frequency of an adult male ranges from 85 to 180 Hertz, while the frequency of an adult female ranges from 165 to 255 Hertz. Step 610 of FIG. 6 may then filter the retrieved set of first agent data. Step 615 may then select a first parameter that may be used in a correlation analysis. Filtering step 610 may filter the retrieved data for the age of the first agent and an event time may be selected in step 615 of FIG. 6, for example.

Correlations may then be performed for all different sets of parametric data in step 620 of FIG. 6. These correlations, combined with the first parameter may be used to identify whether a certain parameter may correspond to other historical at least to a threshold amount. Step 625 of FIG. 6 may then identify whether a certain correlation matches to a predetermined threshold level of >95%. When such a correlation meets this threshold, parameters associated with the correlation may be considered relevant to the first agent, for example if agents with the same age, event time, or other matching factor usually have a high speaking pace, 200 words per minute in the first 5 minutes of a call, the first agent may be experiencing emotional exhaustion. The correlated data point may then be extracted in step 630 and then stored in a database in step 635 of FIG. 6.

Program flow may flow to step 640 from directly from step 625 when step 625 identifies that a particular parameter analyzed does not meet the correlation threshold of >95%. Program flow may also move from to step 640 after step 635. Step 640 is a determination step that may identify whether any parameters remain in a set of retrieved data, when yes program flow may move to step 645 where a next parameter is selected, and then program flow may move to step 620 where an additional correlation may be performed. When step 640 identifies that no additional parameters remain, program flow may move to step 650 that may inform an AI system that the AI system may perform another function.

Figure 7:
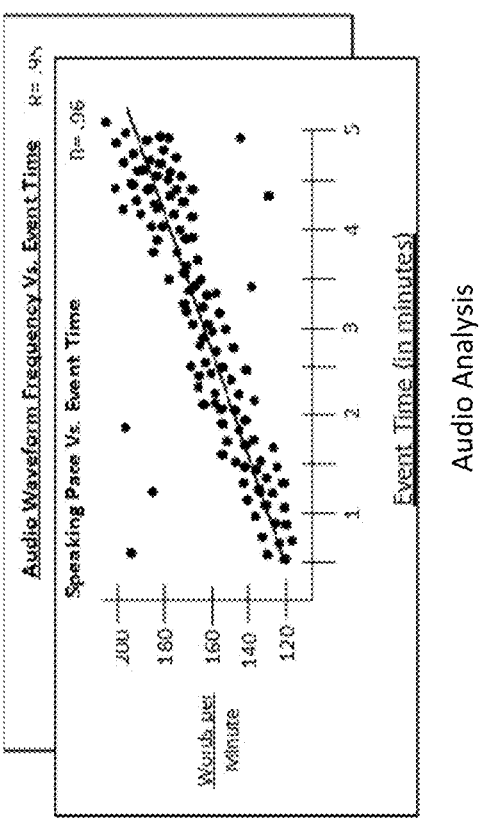
FIG. 7 shows example graphs of data that may be compiled and used by a machine learning module consistent with the present disclosure.
Figure 7:
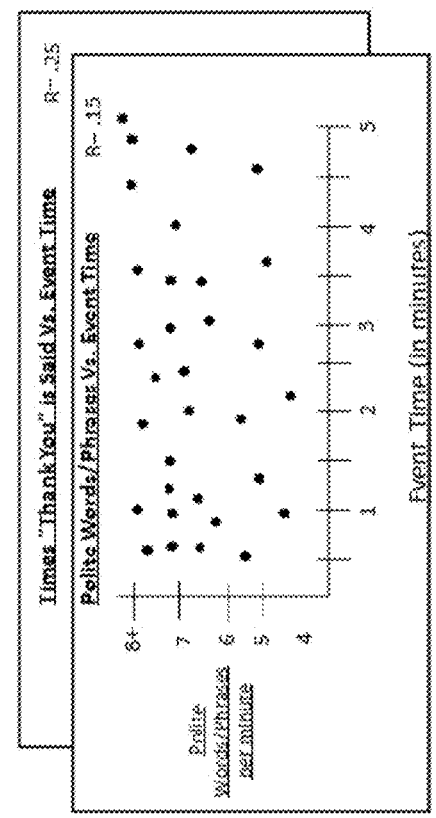

FIG. 7 illustrates how data may be compiled and used by a machine learning module consistent with the present disclosure. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. The data of FIG. 7 may have been collected or tabulated when an agent was engaged in an discussion between an agent a customer when that agent responded to a request from the customer.

FIG. 7 includes various charts, the charts included in FIG. 7 include polite words and phrases versus an event time, times that the phrase "Thank You" was said versus event time, speaking pace versus event time, and audio waveform versus event time. A portion of FIG. 7, identified as "word analysis" is filtered by the event time and finding the various correlations within the first 5 minutes of an event. Various parameters such as polite words used per minute, the number of "Thank You's" said are illustrated in charts included in FIG. 7. Note that the polite words versus event time chart include time in a horizontal axis and a measure of polite words per minute in a vertical axis of the chart. The data in the polite words versus event time chart may be processed using a correlation analysis. When such an analysis identifies that non-correlated parameters with the event time is the number of polite words said has only a 15% correlating (which is below the 95% threshold), there may be a finding that there is no correlation between polite words and event time. In such an instance no data points would be stored in a database based on the meager 15% correlation.

Other charts in FIG. 7 are identified as "audio analysis." In these charts the data that is filtered by the event time and finding the various correlations within the first 5 minutes of an event. Here various parameters include as speaking pace and waveform frequency. Here again an correlation analysis may be performed, when such an analysis identifies that the event time and speaking pace match with a 96% correlating (above the 95% threshold), there may be a finding that there is a correlation between an agents speaking rate increasing in the first 5 minutes of the event. Such a correlation may indicate that an agent is emotionally exhausted and that data may be stored in the Database to be used as a reference for future events. The most re-occurring data point (for example the most re-occurring data point is a speaking rate of 200 words per minute 5 minutes into the event) is extracted and is stored in the database to be used for future reference.

FIG. 8 includes a table of data that associates data associated with different agents with parametric data collected over a span of time. The data in the table of FIG. 8 cross references agent identifiers, agent age, types of data, time, word pace per minute, audio waveform frequency, a measure of polite word, and a number of time the phrase "Thank You" was spoken during the span of an event. The table of FIG. 8 may include data charted in the charts of FIG. 7. Note that each of the ages of the agents in FIG. 8 is 25 and that a type of data analyzed was audio data. Note also that speaking pace of these agents varied between 160 and 180 words per minute with speaking wave form frequencies varying from 225 Hertz (Hz) to 260 Hertz (Hz). One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 8 displays data that may be stored in a Machine Learning Database. Such a Machine Learning Database may display the agent data that is collected through previous events in which an agent has been deemed to have experience emotional exhaustion, for example. Such stored data may be audio, video, or text data that has been collected through operation of an AI system, such as AIS 300 of FIG. 3. This database contains the agent ID, agent age, type of data and for this example, event time, pace which is the speaking pace of the agent, frequency which is the waveform frequency of the agent, polite words which is the amount of polite words used by the agent, and "Thank You's" which is the amount of times that the agent said "Thank You". It should be noted that the above example of the Machine Learning Module may have a various data inputs that have been previously mentioned. Also, the results of various historical analyses, also previously mentioned, may be used as data inputs for the Machine Learning Module. Below are examples of some of the historical analyses that may be performed as reviewed in the following examples Example 1

An example of a historical analysis of data may be a trend analysis on customer aggression data. For example, customer aggression may be determined by comparing historical, real-time or streaming audio or text data to a Customer Aggression database of Table 2, illustrated below. Table 2 shows examples of aggression categories such as yell, insult, curse (like swear words), and threat. An aggression level may be identified by way of a calculation that determines the number of aggressive acts. The identifiers for a yell may be if the waveform or metadata of a waveform or some "mathematical operation of the waveform" (e.g. the number of time units of audio above a certain amplitude), from the audio data, frequency increases, if the waveform amplitude increases, or if the waveform quality decreases, to name a few.

TABLE 2

Customer Aggression Database

| Yell | Insult | Curse | Threat | Aggression Level |
|---|---|---|---|---|
| Waveform Frequency Increases | Dumb | Curse Word 1 | | 3 |
| Waveform Amplitude Increases | Idiot | Curse Word 2 | Or else | 4 |
| | | Curse Word 3 | Just wait | 2 |
| . . . | . . . | . . . | . . . | 4 |

Figure 9:
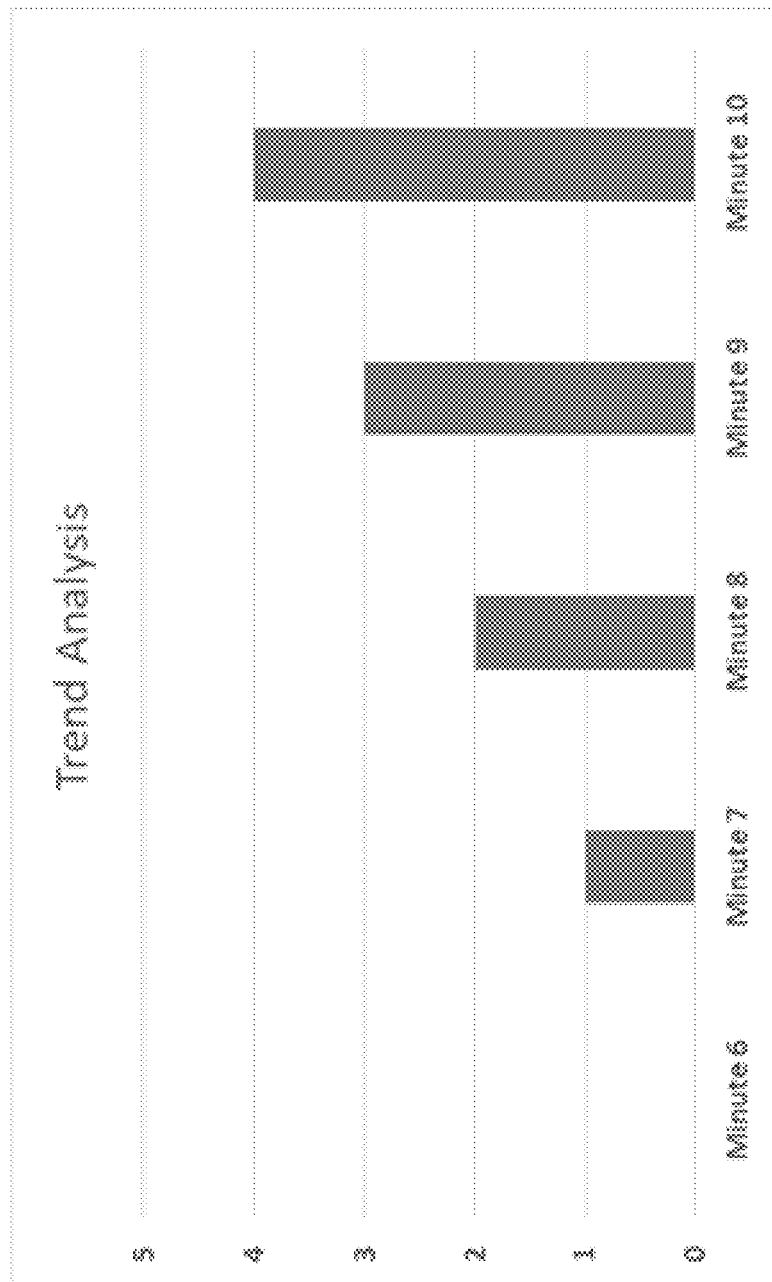
FIG. 9 shows an example graph of a trend analysis showing the number of aggression levels or acts by time.

A historical analysis of data may include a trend analysis on customer aggression data. In such an instance, customer aggression may be determined by comparing historical data used to identify aggressive acts that may be associated with an aggression category. When an aggressive action is identified during an event, the category of that act may be extracted, along with a time stamp. This information may be plotted on a trend analysis graph as shown in FIG. 9. In the graph of FIG. 9 the y-axis shows the number of aggression levels or acts by time. The x-axis of FIG. 9 shows the number of minutes. If a predetermined threshold is reached, i.e. if three out of five categories are identified in a 5 minute period, then it can be concluded that the customer is showing signs of aggression due to an increasing trend of showing aggression towards the agent. However, if the predetermined threshold is not reached and there only 1 or two aggression levels identified over a 25 minute time period it can be determined that the customer is not showing an increasing trend of aggression towards the agent.

Example 2

Another example of historical analysis of data may be a cohort analysis on the depersonalization of an agent. For example, when an agent begins to disengage or stop caring about their work performance there may specific words or phrases that can be collected through audio and/text data from historical archives (words or phrases that are uncaring, or cynical, etc. For each of these words of phrases found, a disengaging level may be calculated, in real-time. Such calculations may be based on data extracted from a stream of data. These words or phrases and the calculation of disengaging level may be stored in a depersonalization database (Table 3) to be compared with the audio and/or text data. Table 3 displays the depersonalization database that contains categories and words, or phrases related to the categories, for example the uncaring category may contain phrases such as, can you repeat that, I don't understand, and I forgot/forget, to name a few. It should be noted that agent actions may also be incorporated into the database such as arriving late to work, taking extending breaks or hanging up on customers.

TABLE 3

Depersonalization Database

| Uncaring | Cynical | Disengaging level |
|---|---|---|
| Can you repeat that? | I didn't say that | 2 |
| I don't understand | . . . | 1 |
| . . . | . . . | . . . |
| Uncaring word/phrase N | Cynical word/phrase N | — |

When a category is identified it may be extracted and stored in a database that tracks the amount of depersonalization actions performed by an agent over a predetermined amount of time, for example by event. These identified depersonalization actions may be analyzed by using a cohort analysis (Table 4). Table 4 shows the cohort analysis of a series of events for an agent, the analysis shows the event number, the number of depersonalization actions during the call, and the events following the event number. For example, Event 1 had 3 depersonalization actions, in the following call (event 2) only 66.6% of the depersonalization actions re-occurred, however in the third, fourth, and fifth following calls 100% of those depersonalization actions re-occurred.

TABLE 4

| Event # | Depersonalization Actions | Events | | | | |
|---|---|---|---|---|---|---|
| | | 1 | 2 | 3 | 4 | 5 |
| 1 | 3 | 66.6% | 33.3% | 100.0% | 100.0% | 100.0% |
| 2 | 2 | 50.0% | 100.0% | 100.0% | 100.0% | |
| 3 | 1 | 100.0% | 100.0% | 100.0% | | |
| 4 | 4 | 100.0% | 100.0% | | | |
| 5 | 6 | 100.0% | | | | |
| 6 | 8 | | | | | |

This analysis can show whether the agent is continuously using depersonalization actions during events, as well as determine if new actions are occurring through a series of calls. If the percentages are increasing or remain over a predetermined percentage, for example over 85%, then it can be concluded that the agent is disengaged from their work and is experiencing emotional exhaustion. In Table 4, this 85% threshold is exceeded for three straight calls and this data may be sent to a supervisor display with a recommendation to relieve the agent for a short break or if the actions continue send the agent home for the day. These types of analysis may also be performed over a longer period of time, for example three months, in order determine if an agent is slowly becoming disengaged from the work due to depersonalization. If this is the case a recommendation may be sent to a supervisor to suggest to the agent to take some vacation time, see a doctor or therapists, etc.

Example 3

Another example of historical analysis of data may be using a SWOT analysis on employee churn. For example, when an employee is terminated from the company either voluntary, e.g., for a better opportunity, or involuntary, e.g., poor performance, they can be given an exit survey. This survey (Termination Survey, e.g., as shown in Table 5) may be directed to determine potential stress activators for employees which may lead to the employee being terminated. Table 5 shows a potential example of the termination survey in which there are survey questions and choices to be selected by the employee, the choices are different depending on how the employee was terminated. For example, one survey question may be "what was the biggest cause of stress on calls?" and the choices for the voluntary terminated employee may be "customer verbal aggression, decreased job autonomy, or increased performance monitoring". It should be noted that this survey may be structured in multiple ways in order to collect terminated employee data such as a write in survey, choices selected from emotional exhaustion results from previously terminated employees, etc.

TABLE 5

| Survey Questions | Voluntary Termination | Involuntary Termination |
|---|---|---|
| What was the biggest cause of stress on calls? | Customer Verbal Aggression Decreased Job Autonomy Increased Performance Monitoring | Highly Demanding Customers Increased Emotional Labor Increased Time Pressure |
| What was the biggest self-identified factor for stress? | Age Tenure Perception of Control | Emotion Regulation Depersonalization |
| Survey Question N | — | — |

Historical Analysis of data may be stored in a database, such as an enterprise data warehouse system used for reporting and data analysis, and that may be referred to as Big Data analysis. Such analysis may include, yet is not limited to (1) time series analysis, (2) statistical analysis, (3) qualitative research data analysis, (4) fundamental analysis for forecasting, (5) qualitative comparative analysis, (6) SWOT analysis, (7) interpretative phenomenological analysis (transcriptions), (8) meta-analysis, (9) specific technical analysis, (10) sociological analysis, (11) comparative historical research analysis, (12) trend analysis, (13) emerging issues analysis, (14) spatial analysis, (15) numerical analysis, (16) principal component analysis, (17) Link analysis is uses to evaluate relationships (connections) between nodes, (18) bioinformatics analysis, (19) scenario analysis, (20) machine learning analysis, (21) content analysis, (22) data visualization analysis, (23) Cohort analysis, (24) multilinear principal component analysis, (25) Contrastive analysis (the systematic study of a pair of languages with a view to identifying their structural differences and similarities, (26) indicator analysis, (27) analysis of variance, (28) Chaos theory analysis, (29) sentiment analysis (sometimes known as sentiment analysis or emotion AI) refers to the use of natural language processing, text analysis, computational linguistics, (30) demographic analysis.

The employee selections are stored in a database and can be analyzed using a SWOT analysis (e.g., as shown in Table 6), to determine emotional exhaustion of terminated employees. Results of Table 5 may be used to populate Table 6 automatically, in that certain survey answers (e.g. customer verbal aggression in Table 5 results in a weakness in Table 6). The voluntary termination choices may be categorized as "weaknesses" or "threats" since the employee is leaving the company on their own decision. It may be concluded from these choices that employees that experience an increase in these emotional exhaustion data inputs are more likely to leave the company for other opportunities. This mapping could then be used to create numerical values automatically. Also, the data of Table 5 could be input by using data from real time or historical data from the other examples above (trend analysis, cohort analysis) so in real time a profile of call agents can be developed. With enough data in the system, the system could predict call agents that could be involuntary terminated.

TABLE 6

| SWOT Analysis | |
|---|---|
| Strength | Weakness |
| Handling Demanding Customers | Customer Verbal Aggression |
| Emotional Labor | Decreased Job Autonomy |
| Productivity metrics | Increased Performance Monitoring |
| Emotion Regulation | Age |
| Depersonalization | Tenure |
| | Perception of Control |
| Opportunity | Threat |

Results of this historical data analysis may be used as a data input for the machine learning/AI model described above in order to determine the threshold in which employees are subjected to these types of events. Conversely, the involuntary termination choices may be categorized as "strengths" or "opportunities" since the employee has been terminated due to job performance. This shows that the company has baseline expectation that employees are required to handle certain types of events and interactions with the customers. It may be concluded from these choices that employees are expected to handle demanding customers and maintain a level of professionalism above a predetermined base threshold of emotional exhaustion, without exceeding a predetermined threshold that would warrant concern. For example, an employee may be expected to handle at least one highly demanding customer per day. This event would increase the employee's total emotional exhaustion levels above the baseline threshold but would not be the same if the employee handled 10 highly demanding customers in a row. This baseline threshold may also be used as an emotional exhaustion data input for the machine learning/AI model described above to determine if the employee is maintaining a certain performance level.

In certain instances, an example apparatus consistent with the present disclosure may use a blockchain database that contains information about employee perks, such as, days off, better shifts, company swag, gift cards, or cash bonuses, in which the employees may be given tokens/credits/keys to access the employee perks. The blockchain databases may include customer or requestor perks information, such as, awards, cash or discounts on company's products and/or services, third party vendor products and/or services, move up higher in a priority of queue of pending requests, or request to be routed to a live agent immediately. The blockchain database may send the private and public keys to the AI system to be stored and/or processed by the AI system. The AI system may send the public keys to the users (e.g., agents, supervisors, requestors, or customers) based upon one or more factors associated with a communication request. The users may send the public key to the AI system to be combined to with the corresponding private key in order to access the perk in the blockchain database. The perk, once unlocked by the use of the private and public keys, is sent to the user to be used as they desire.

One or more agents may receive employee perks through public keys from the AIS 300 of FIG. 3, these may be used for achieving specific operational or performance goals. For example, agents may receive public keys in response to positive feedback surveys if the requestor's goal was met satisfactorily by those agents. The agents may also opt-in or indicate their willingness to process more difficult (e.g., based on the requestor's relatively high emotional exhaustion measure) communication requests that would otherwise not be routed to them by a routing engine and receive public keys from other agents to whom that request was or would otherwise have been routed instead. In other embodiments, agents may also be rewarded public keys based on emotional exhaustion measures such that if the requestor's emotional exhaustion measure drops by a certain percentage or below specific threshold during a communication request, then the agent will be awarded with a public key associated with an employee perk. Still other embodiments of awarding public keys to users are possible.

Alternatively or additionally, customers or requestors may receive perks through public keys from a AI system. For example, a customers or requestor may receive one or more public keys as a remediation effort after their communication request has been handled poorly by an agent. This, in turn, may be determined by analyzing the customer's or requestor's emotional exhaustion metric level rises above a specific threshold during the processing of a communication request by an agent. In that scenario, a customer may use the public key to access one or more customer perks in the blockchain database.

Note that an AI system may include or otherwise be communicatively coupled to an AI system portal that can be used by users (e.g., agents, supervisors, or customers) to interact with other users or members. This AIS Portal may be an online community site that allows members to manage, track and redeem the perks they have acquired through combining their public key with the private key, from the AIS 300, to access the perks on the blockchain database. The AIS Portal may have a security/privacy level that forces the member to sign into the AIS Portal with the use of a user name/password combination, security questions, biometric, etc. in order to input their acquired public key to be combined with the corresponding private key to access the blockchain database. Once logged into the AIS Portal the member may also trade or acquire other member's public keys by completing certain actions.

Figure 10:
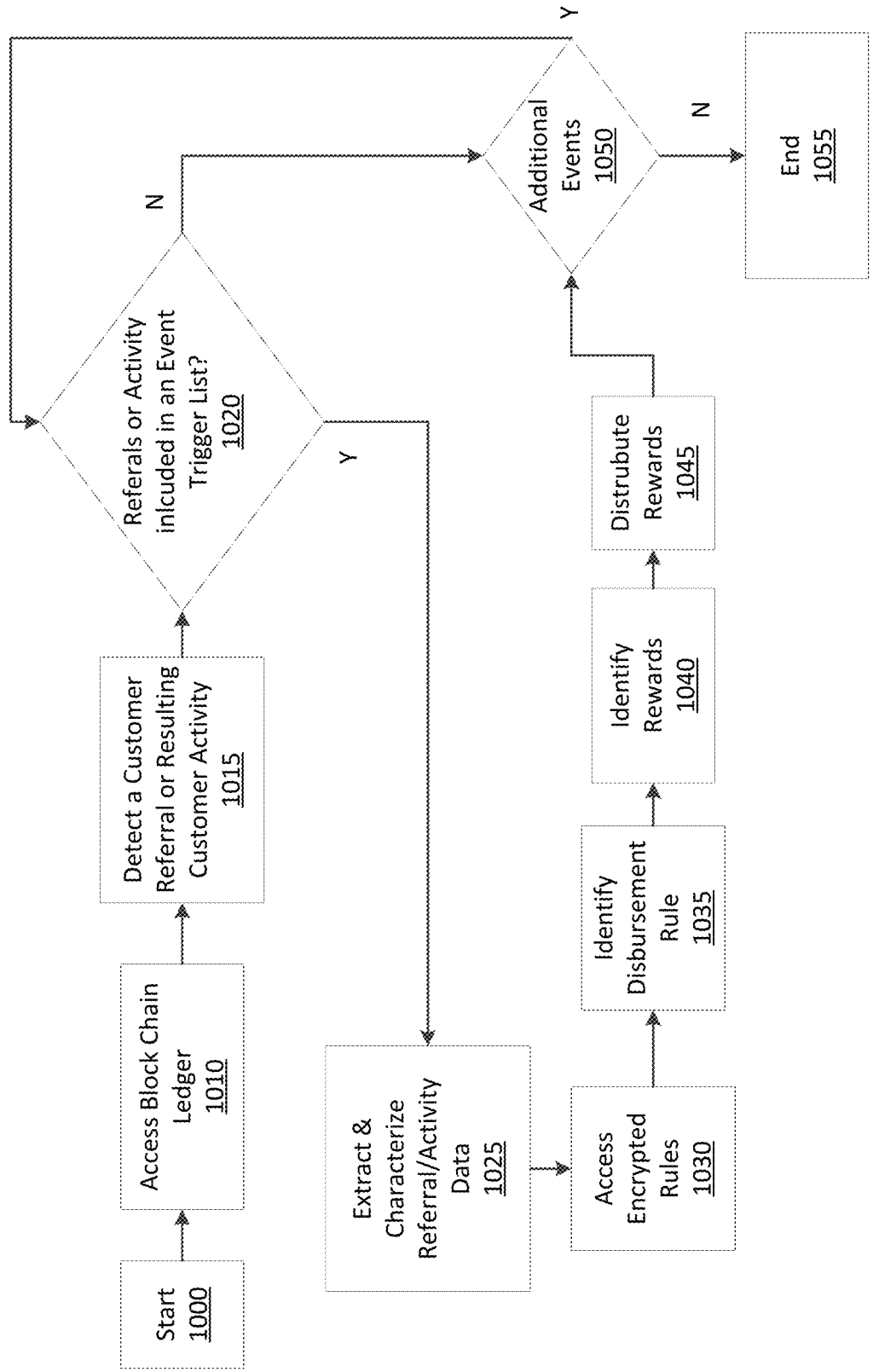
FIG. 10 illustrates an exemplary chart of program flow that may be implemented to calculate rewards that may be provided to an agent working at a call center.

FIG. 10 illustrates an exemplary chart of program flow that may be implemented to calculate rewards that may be provided to an agent working at a call center. FIG. 10 includes step 1000, where compensation calculation software may be initiated. After step 1000, program flow moves to step 1010, where a ledger that tracks Block chains may be accessed. After step 1010, information relating to a number of customer referrals or customer activities may be accessed. These referrals or activities may be associated with acts performed by an agent. Determination step 1020 may then identify whether a referral or activity attributed to an employee is listed in a trigger list, when no, program flow moves to determination step 1050. Determination step 1050 may identify whether additional events relating to the agent should be reviewed, when yes program flow moves back to determination step 1020. When determination step 1050 indicates that there are not any other agent events to be reviewed, the program flow ends in step 1055 of FIG. 10.

When step 1020 identifies that an agent referrals or activity is included in a trigger list program flow moves to step 1025 where referral and activity data are extracted, next in step 1030 rules used to encrypt compensation information may be accessed. After step 1030, step 1035 identifies a disbursement rule, step 1040 may identify rewards that should be distributed to the agent and those identified rewards may be distributed to the agent, using a Block chain payment, for example. After step 1045, program flow moves to back to step 1050.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Throughout the description, where articles, devices, and systems are described as having, including, or comprising specific components, or where processes and methods are described as having, including, or comprising specific steps, it should be understood that, additionally, there are articles, devices, and systems of the present invention that consist essentially of, or consist of, the recited components, and that there are processes and methods according to the present invention that consist essentially of, or consist of, the recited processing steps. An order of steps or order for performing actions is immaterial so long as the invention remains operable. Moreover, two or more steps or actions may be conducted simultaneously.

The mention herein of any publication or patent application, for example, in the Background section, is not an admission that such publication or patent application constitutes prior art with respect to any of the claims or subject matter presented herein. The Background section is presented for purposes of clarity and is not intended to be a description of prior art with respect to any claim.

Various implementations of the systems and techniques described here can be realized in digital electronic circuitry, integrated circuitry, specially designed ASICs (application specific integrated circuits), computer hardware, firmware, software, and/or combinations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Other Embodiments

Embodiment 1

A method for routing communications, the method comprising: receiving a request from a computing device associated with a requestor that is associated with a first type of communication channel; receiving information included in a set of communications with the requestor computing device; calculating an emotional exhaustion score, the calculation based on the received information included in the set of communications; identifying that the emotional exhaustion score has at least met an emotional exhaustion threshold; and initiating a corrective action based on the emotional exhaustion score at least meeting the exhaustions threshold.

Embodiment 2

The method of Embodiment 1, wherein the corrective action includes routing communications from the requestor user device to a computing device associated with a human agent and the method further comprises collecting communication information associated with communications between the requestor computing device and the human agent computing device.

Embodiment 3

The method of any of Embodiments 1-2, further comprising calculating an emotional exhaustion score associated with the human agent.

Embodiment 4

The method of any of Embodiments 1-3, further comprising identifying that the human agent emotional exhaustion score has crossed a threshold associated with the human agent.

Embodiment 5

The method of any of Embodiments 1-4, further comprising sending advice messages to the human agent computing device.

Embodiment 6

The method of any of Embodiments 1-5, further comprising identifying that the performance of the human agent is consistent with an event in a reward trigger list, wherein the human agent is provided with the reward based on the identification that the performance of the human agent is consistent with the event.

Embodiment 7

The method of any of Embodiments 1-6, further comprising: identifying that the performance of the human agent is consistent with a correlation threshold related to a human performance factor; and storing information associated with the performance of the human agent in a database based on the identification that the performance of the human agent is consistent with the correlation threshold.

Embodiment 8

A non-transitory computer-readable storage medium having embodied thereon a program executable by a processor for routing communications, the method comprising: receiving a request from a computing device associated with a requestor that is associated with a first type of communication channel; receiving information included in a set of communications with the requestor computing device; calculating an emotional exhaustion score, the calculation based on the received information included in the set of communications; identifying that the emotional exhaustion score has at least met an emotional exhaustion threshold; and initiating a corrective action based on the emotional exhaustion score at least meeting the exhaustions threshold.

Embodiment 9

The non-transitory computer-readable storage medium of Embodiment 8, wherein the corrective action includes routing communications from the requestor user device to a computing device associated with a human agent and the program is further executable to collect communication information associated with communications between the requestor computing device and the human agent computing device.

Embodiment 10

The non-transitory computer-readable storage medium of any of Embodiments 8-9, wherein the program is further executable to calculate an emotional exhaustion score associated with the human agent.

Embodiment 11

The non-transitory computer-readable storage medium of any of Embodiments 8-10, wherein the program is further executable to identify that the human agent emotional exhaustion score has crossed a threshold associated with the human agent.

Embodiment 12

The non-transitory computer-readable storage medium of any of Embodiments 8-11, wherein the program is further executable to send advice messages to the human agent computing device.

Embodiment 13

The non-transitory computer-readable storage medium of any of Embodiments 8-12, wherein the program is further executable to identify that the performance of the human agent is consistent with an event in a reward trigger list, wherein the human agent is provided with the reward based on the identification that the performance of the human agent is consistent with the event.

Embodiment 14

The non-transitory computer-readable storage medium of any of Embodiments 8-13, wherein the program is further executable to: identify that the performance of the human agent is consistent with a correlation threshold related to a human performance factor; and store information associated with the performance of the human agent in a database based on the identification that the performance of the human agent is consistent with the correlation threshold.

Embodiment 15

An apparatus for routing communications, the apparatus comprising: a memory; and a processor that: receives a request from a computing device associated with a requestor that is associated with a first type of communication channel, receives information included in a set of communications with the requestor computing device, calculates an emotional exhaustion score, the calculation based on the received information included in the set of communications, identifies that the emotional exhaustion score has at least met an emotional exhaustion threshold, and initiates a corrective action based on the emotional exhaustion score at least meeting the exhaustions threshold.

Embodiment 16

The apparatus of Embodiment 15, wherein the corrective action includes routing communications from the requestor user device to a computing device associated with a human agent and communication information associated with communications between the requestor computing device and the human agent computing device are collected.

Embodiment 17

The apparatus of any of Embodiments 15-16, wherein the processor executes instructions out of the memory to calculate an emotional exhaustion score associated with the human agent.

Embodiment 18

The apparatus of any of Embodiments 15-17, wherein the processor executes instructions out of the memory to identify that the human agent emotional exhaustion score has crossed a threshold associated with the human agent.

Embodiment 19

The apparatus of any of Embodiments 15-18, wherein the processor executes instructions out of the memory to identify that the performance of the human agent is consistent with an event in a reward trigger list, wherein the human agent is provided with the reward based on the identification that the performance of the human agent is consistent with the event.

Embodiment 20

The apparatus of any of Embodiments 15-19, wherein the processor executes instructions out of the memory to identify that the performance of the human agent is consistent with a correlation threshold related to a human performance factor and the apparatus further comprising a database that stores information associated with the performance of the human agent.

Embodiment 21

A computer-implemented method for routing a communication request initiated by a requestor, comprising: receiving, by a processor of an augmented intelligence system over a network, a transmission request from a routing engine to provide an emotional exhaustion metric for each of one or more human agents in a contact center that are available to process the communication request from the requestor; receiving, by the processor of augmented intelligence system, at least one of streaming data and historical data associated with any of the one or more human agents, the communication request and the requestor, operating, by the processor of augmented intelligence system, a data analytics engine to calculate the metric for each agent based on any of the received streaming data and historical data; wherein, the data analytics engine selects and applies an emotional exhaustion model to infer a probability of each of the human agents being emotionally exhausted over a specific period of time; and transmitting, by the processor of augmented intelligence system, to the routing engine the emotional exhaustion metric for each of the one or more human agents in the contact center wherein the routing engine uses that information to route the communication request to any one of (i) one of the human agents, (ii) an automated interaction component, and (iii) a self-service capability configured to process the communication request.

Embodiment 22

The method of Embodiment 21, wherein the routing engine routes the communication request to one of the human agents.

Embodiment 23

The method of any of Embodiments 21-22, wherein the streaming data related to the one or more human agents processing the communication request is transmitted to the augmented intelligence system and is processed the data analytics engine to update the emotional exhaustion metric for the one or more human agents based on the streaming data.

What is claimed is:

1. A method for routing communications, the method comprising:
   receiving, via a computer network, by a processor of an intake processing system, a request from a computing device associated with a requestor that is associated with a first type of communication channel;
   receiving, by the processor of the intake processing system, information included in a set of communications with the requestor computing device, the information comprising voice data associated with a user, and transmitting, by the processor of the intake processing system, the voice data to an augmented intelligence system;
   extracting, by a processor of the augmented intelligence system, from the voice data, metrics comprising one or more from the group consisting of pitch, tone, spoken pace, and vocal effort;
   calculating, by the processor of the augmented intelligence system, from the metrics, an emotional exhaustion score;
   identifying, by the processor of the augmented intelligence system, that the emotional exhaustion score has at least met an emotional exhaustion threshold; and
   identifying, by the processor of the augmented intelligence system, a corrective action based on the emotional exhaustion score the corrective action comprising routing communication from the computing device associated with the requestor to a computing device associated with a human agent;
   transmitting, by the processor of the augmented intelligence system, the metrics and command data associated with the corrective action to a routing engine;
   selecting, by a processor of the routing engine, based at least in part on the metrics and historical data associated with available human agents, a selected human agent, wherein the historical data comprises results of a spoken word correlation analysis and an audio analysis; and
   routing, by the processor of the routing engine, the set of communications to the selected human agent.

2. The method of claim 1, wherein the method further comprises collecting communication information associated with communications between the requestor computing device and the human agent computing device.

3. The method of claim 2, further comprising calculating an emotional exhaustion score associated with the human agent.

4. The method of claim 3, further comprising identifying that the human agent emotional exhaustion score has crossed a threshold associated with the human agent.

5. The method of claim 4, further comprising sending advice messages to the human agent computing device.

6. The method of claim 2, further comprising identifying that the performance of the human agent is consistent with an event in a reward trigger list, wherein the human agent is provided with the reward based on the identification that the performance of the human agent is consistent with the event.

7. The method of claim 2, further comprising:
   identifying that the performance of the human agent is consistent with a correlation threshold related to a human performance factor; and
   storing information associated with the performance of the human agent in a database based on the identification that the performance of the human agent is consistent with the correlation threshold.

8. A non-transitory computer-readable storage medium having embodied thereon a program executable by a processor for routing communications to perform operations comprising:
   receiving, via a computer network, by a processor of an intake processing system, a request from a computing device associated with a requestor that is associated with a first type of communication channel;
   receiving, by the processor of the intake processing system, information included in a set of communications with the requestor computing device, the information comprising voice data associated with a user, and transmitting, by the processor of the intake processing system, the voice data to an augmented intelligence system;
   extracting, by a processor of the augmented intelligence system, from the voice data, metrics comprising one or more from the group consisting of pitch, tone, spoken pace, and vocal effort;
   calculating, by the processor of the augmented intelligence system, from the metrics, an emotional exhaustion score;
   identifying, by the processor of the augmented intelligence system, that the emotional exhaustion score has at least met an emotional exhaustion threshold; and
   identifying, by the processor of the augmented intelligence system, a corrective action based on the emotional exhaustion score the corrective action comprising routing communication from the computing device associated with the requestor to a computing device associated with a human agent;
   transmitting, by the processor of the augmented intelligence system, the metrics and command data associated with the corrective action to a routing engine;
   selecting, by a processor of the routing engine, based at least in part on the metrics and historical data associated with available human agents, a selected human agent, wherein the historical data comprises results of a spoken word correlation analysis and an audio analysis; and
   routing, by the processor of the routing engine, the set of communications to the selected human agent.

9. The non-transitory computer-readable storage medium of claim 8, wherein the program is further executable to collect communication information associated with communications between the requestor computing device and the human agent computing device.

10. The non-transitory computer-readable storage medium of claim 9, wherein the program is further executable to calculate an emotional exhaustion score associated with the human agent.

11. The non-transitory computer-readable storage medium of claim 10, wherein the program is further executable to identify that the human agent emotional exhaustion score has crossed a threshold associated with the human agent.

12. The non-transitory computer-readable storage medium of claim 11, wherein the program is further executable to send advice messages to the human agent computing device.

13. The non-transitory computer-readable storage medium of claim 9, the program is further executable to identify that the performance of the human agent is consistent with an event in a reward trigger list, wherein the human agent is provided with the reward based on the identification that the performance of the human agent is consistent with the event.

14. The non-transitory computer-readable storage medium of claim 9, wherein the program is further executable to:
 identify that the performance of the human agent is consistent with a correlation threshold related to a human performance factor; and
 store information associated with the performance of the human agent in a database based on the identification that the performance of the human agent is consistent with the correlation threshold.

15. An apparatus for routing communications, the apparatus comprising:
 a memory; and
 a processor of an intake processing system that receives, via a computer network, a request from a computing device associated with a requestor that is associated with a first type of communication channel,
 receives information included in a set of communications with the requestor computing device, the information comprising voice data associated with a user, and
 transmits the voice data to an augmented intelligence system;
 a processor of the augmented intelligence system that extracts, from the voice data, metrics comprising one or more from the group consisting of pitch, tone, spoken pace, and vocal effort,
 calculates, from the metrics, an emotional exhaustion score;
 identifies that the emotional exhaustion score has at least met an emotional exhaustion threshold, and
 identifies a corrective action based on the emotional exhaustion score the corrective action comprising routing communication from the computing device associated with the requestor to a computing device associated with a human agent, and
 transmits, the metrics and command data associated with the corrective action to a routing engine; and
 a processor of the routing engine that selects, based at least in part on the metrics and historical data associated with available human agents, a selected human agent, wherein the historical data comprises results of a spoken word correlation analysis and an audio analysis, and
 routes the set of communications to the selected human agent.

16. The apparatus of claim 15, wherein communication information associated with communications between the requestor computing device and the human agent computing device are collected.

17. The apparatus of claim 16, wherein the processor executes instructions out of the memory to calculate an emotional exhaustion score associated with the human agent.

18. The apparatus of claim 17, wherein the processor executes instructions out of the memory to identify that the human agent emotional exhaustion score has crossed a threshold associated with the human agent.

19. The apparatus of claim 16, wherein the processor executes instructions out of the memory to identify that the performance of the human agent is consistent with an event in a reward trigger list, wherein the human agent is provided with the reward based on the identification that the performance of the human agent is consistent with the event.

20. The apparatus of claim 16, wherein the processor executes instructions out of the memory to identify that the performance of the human agent is consistent with a correlation threshold related to a human performance factor and the apparatus further comprising a database that stores information associated with the performance of the human agent.

* * * * *